United States Patent [19]

Barnes et al.

[11] 4,160,120
[45] Jul. 3, 1979

[54] LINK ENCRYPTION DEVICE

[75] Inventors: Vera L. Barnes, Wayne; Thomas J. Dodds, Jr., Drexel Hill; Harold F. Gibson, Downingtown; Carl M. Campbell, Jr., Newtown Square, all of Pa.

[73] Assignee: Burroughs Corporation, Detroit, Mich.

[21] Appl. No.: 852,443

[22] Filed: Nov. 17, 1977

[51] Int. Cl.$^2$ .............................................. H04L 9/00
[52] U.S. Cl. ............................. 178/22; 340/146.1 AL
[58] Field of Search ................. 178/22; 340/146.1 AL

[56] References Cited

U.S. PATENT DOCUMENTS

| | | | |
|---|---|---|---|
| 3,876,832 | 4/1975 | Morgan et al. | 178/22 |
| 3,911,216 | 10/1975 | Bartek et al. | 178/22 |
| 3,984,668 | 10/1976 | Zetterberg et al. | 178/22 |

OTHER PUBLICATIONS

C. M. Campbell, Jr.; "Design and Specification of Cryptographic Capabilities"; preprint papers of *NBS Conference on Computer Security and the Data Encryption Standard*; 15 Feb. 1977.

B. Morgan; "Considerations in Applying an Encryption Device to a Communications Network"; Preprint Papers of *NBS Conference on Computer Security and the Data Encryption Standard*; 15 Feb. 1977.

*Primary Examiner*—S. C. Buczinski
*Attorney, Agent, or Firm*—Mark T. Starr; Edmund M. Chung; Kevin R. Peterson

[57] ABSTRACT

An apparatus for insertion in a communications line for providing both message integrity and message secrecy within a significant portion of existing communications networks. At the transmitter end, the apparatus receives messages from the communications line, enciphers them on a bit-by-bit basis and retransmits them onto the communications line. At the receiver end, the apparatus receives messages from the communications line, deciphers them on a bit-by-bit basis and retransmits them onto the communications line. The apparatus contains both a transmitter and receiver and is capable of full duplex operation in a bidirectional communications line. According to the invention, data is enciphered by combining the data received with the output of an algorithm, the algorithm output being responsive to data previously received and a unique key entered by the user. As a data bit is received, it is combined with the output of the algorithm, transmitted, and using cipher feedback techniques fed back as an input to the algorithm to be used to encipher subsequently received data bits. Data is deciphered using equivalent elements as used for enciphering, the basic difference in the apparatus operation being the point from which data fed back into the algorithm is taken.

26 Claims, 17 Drawing Figures

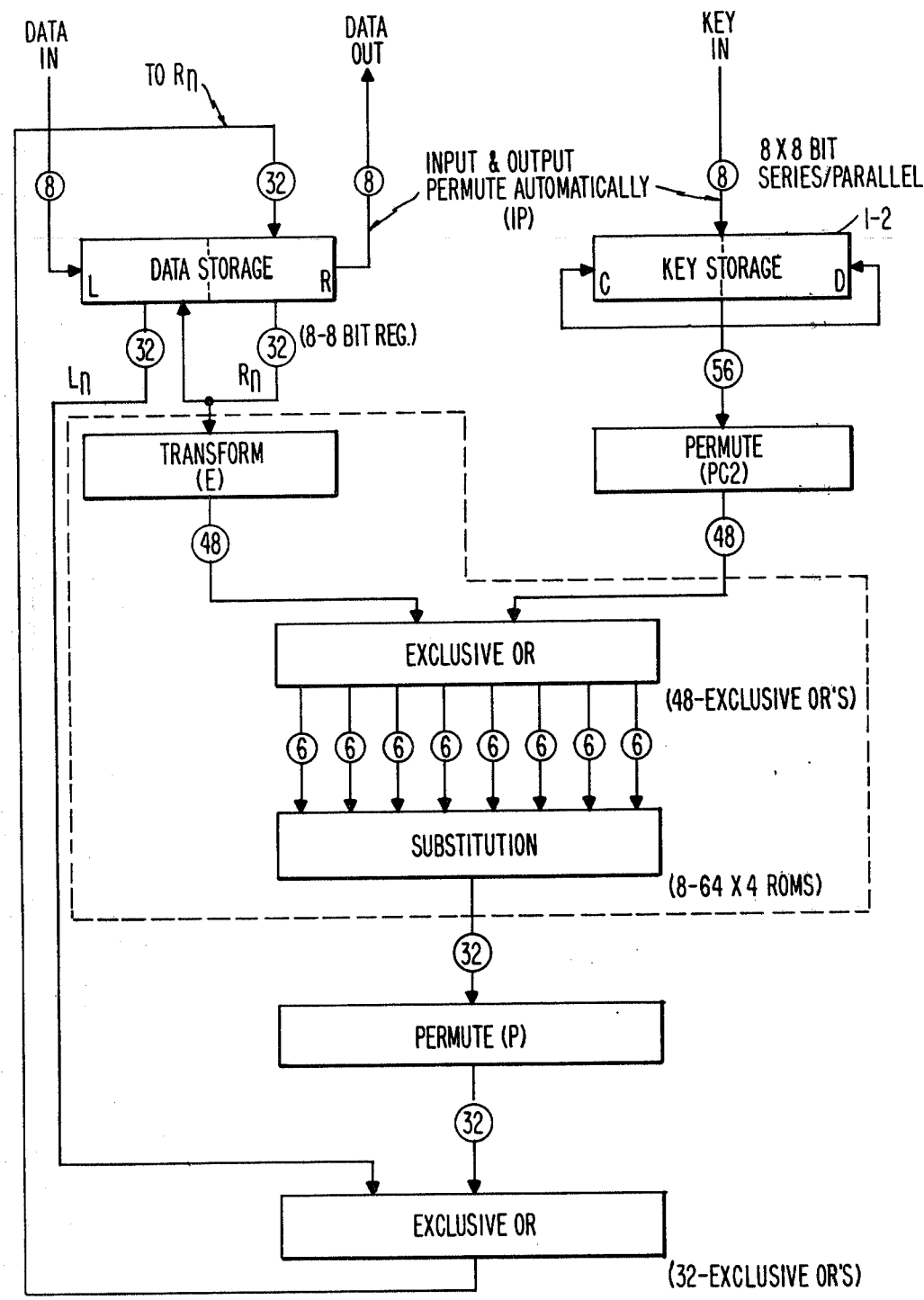
_Fig.1_

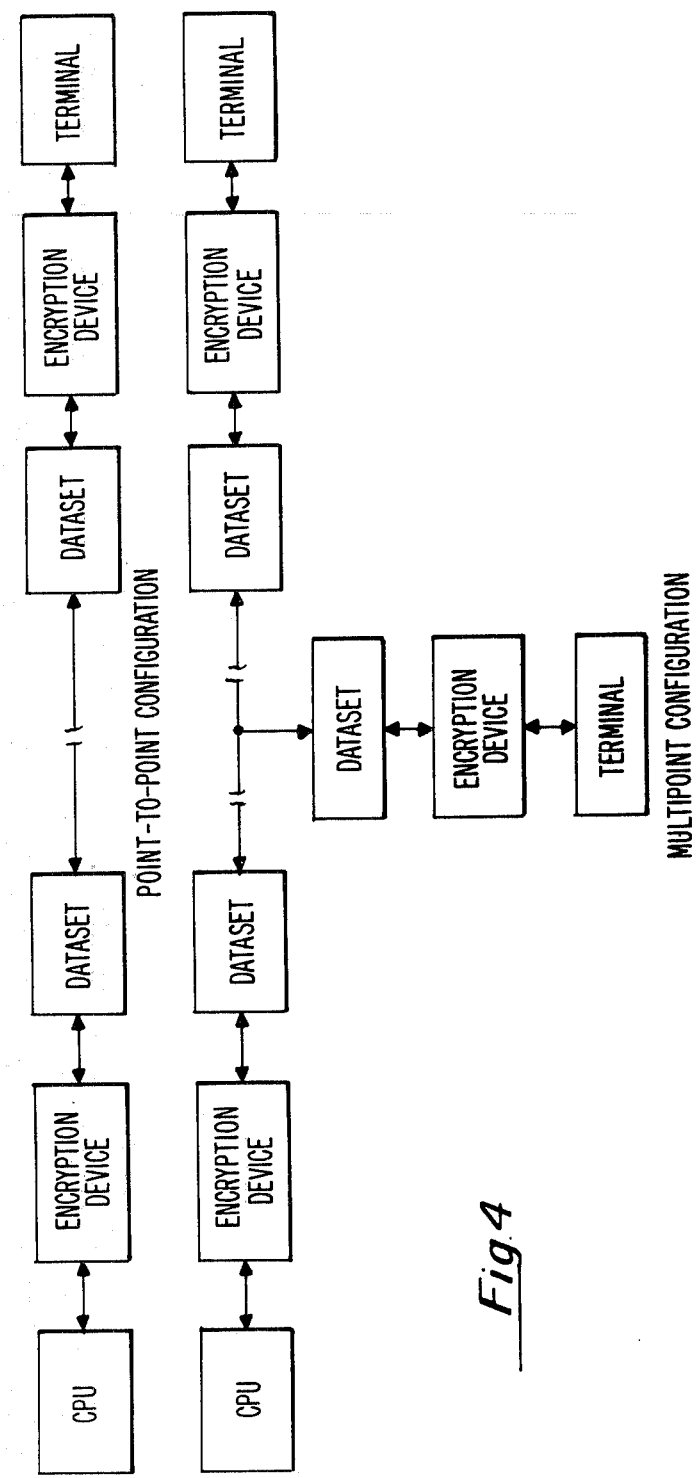
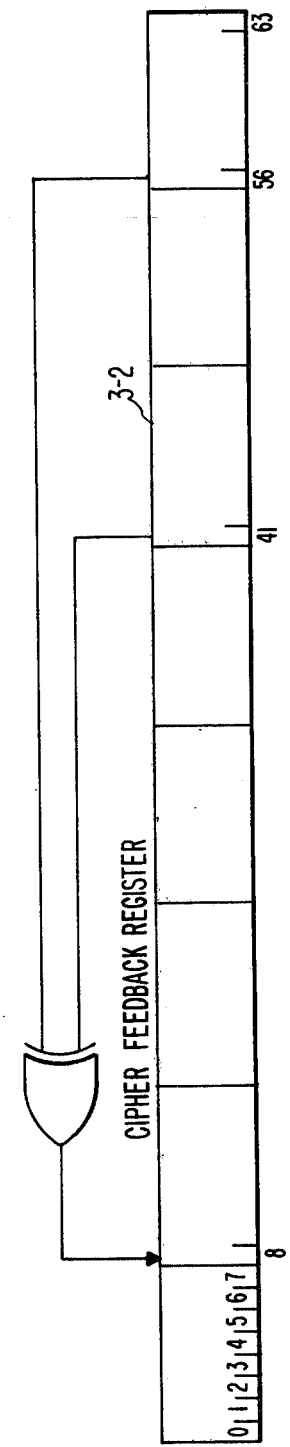
Fig. 4
Fig. 3

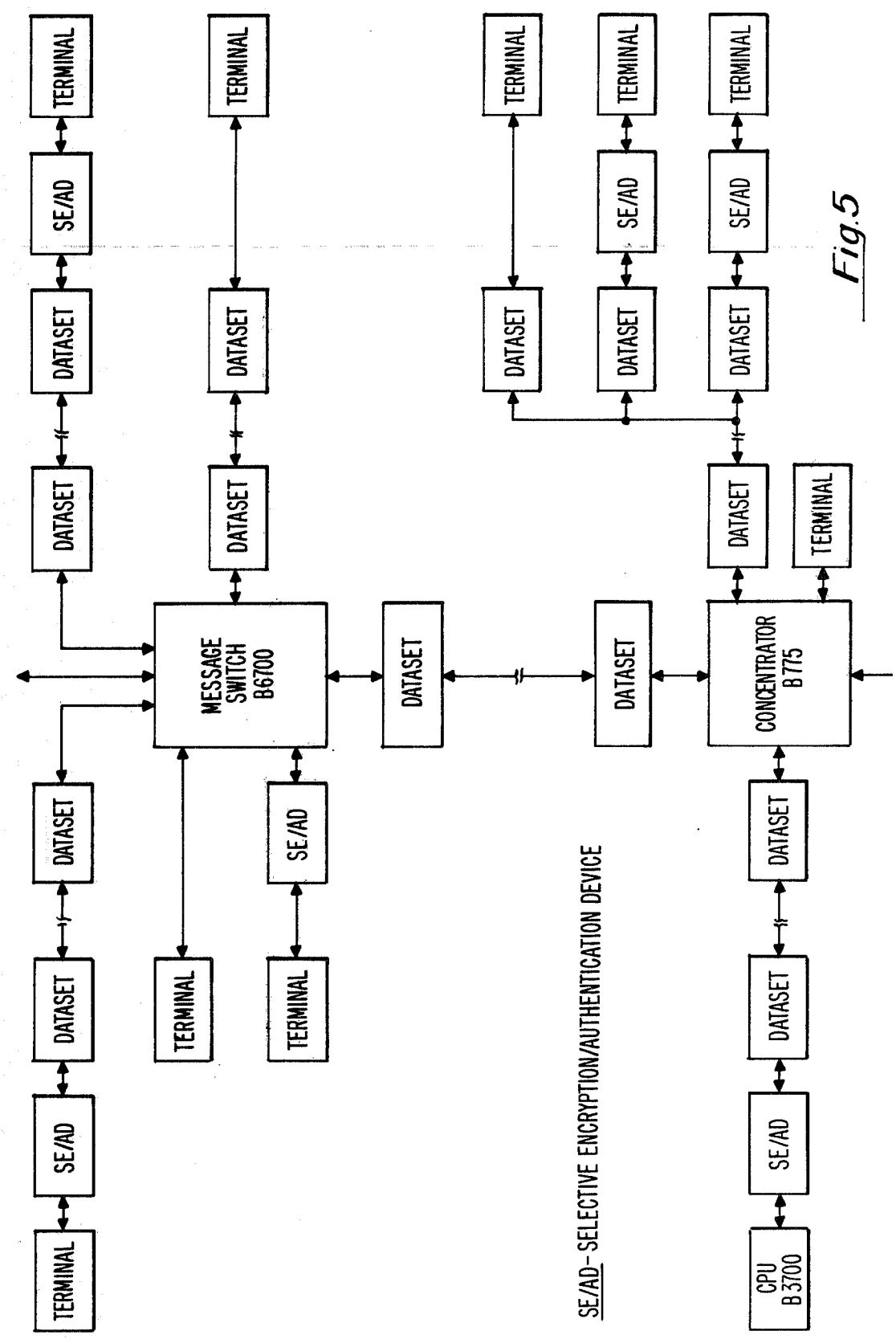

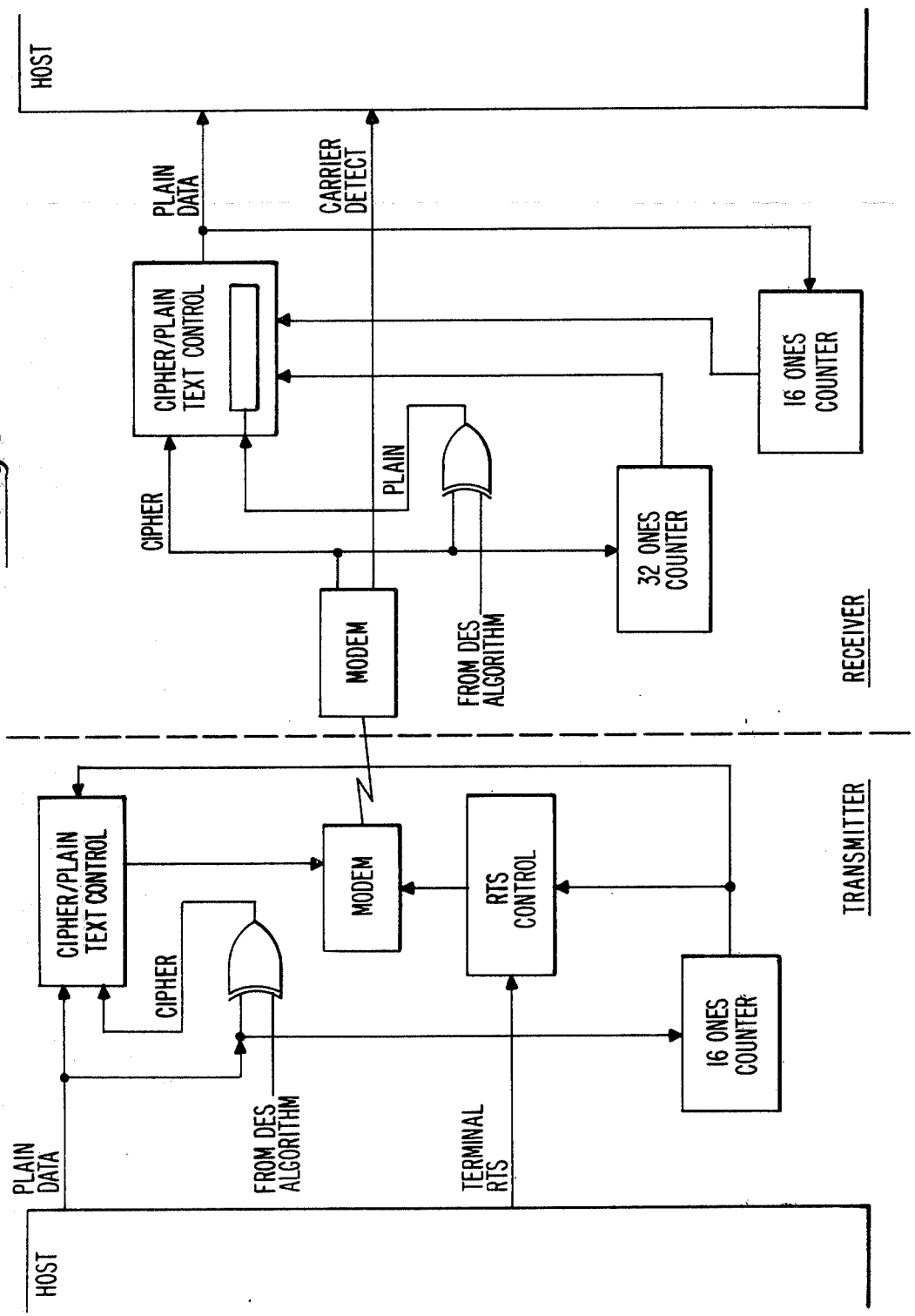

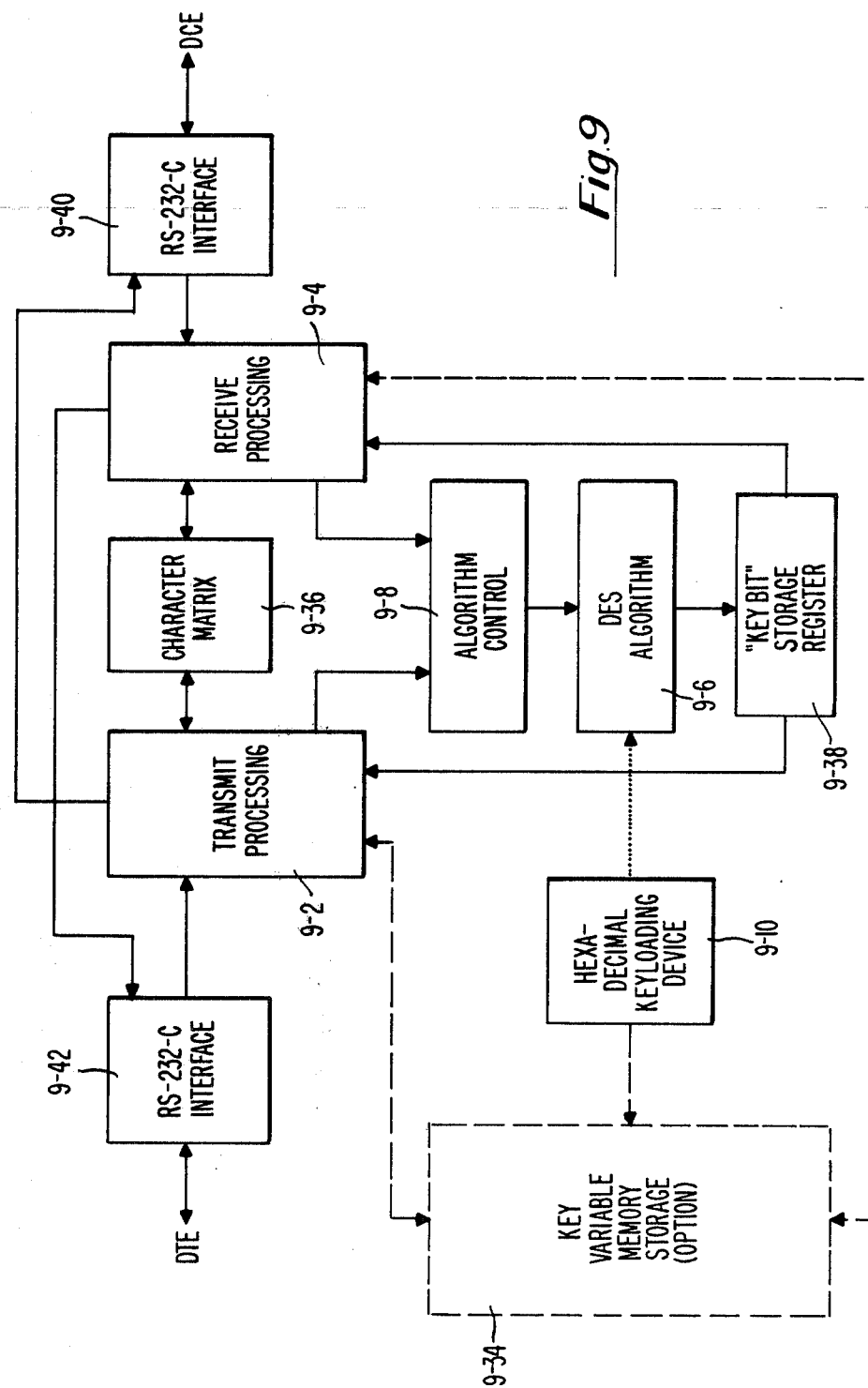

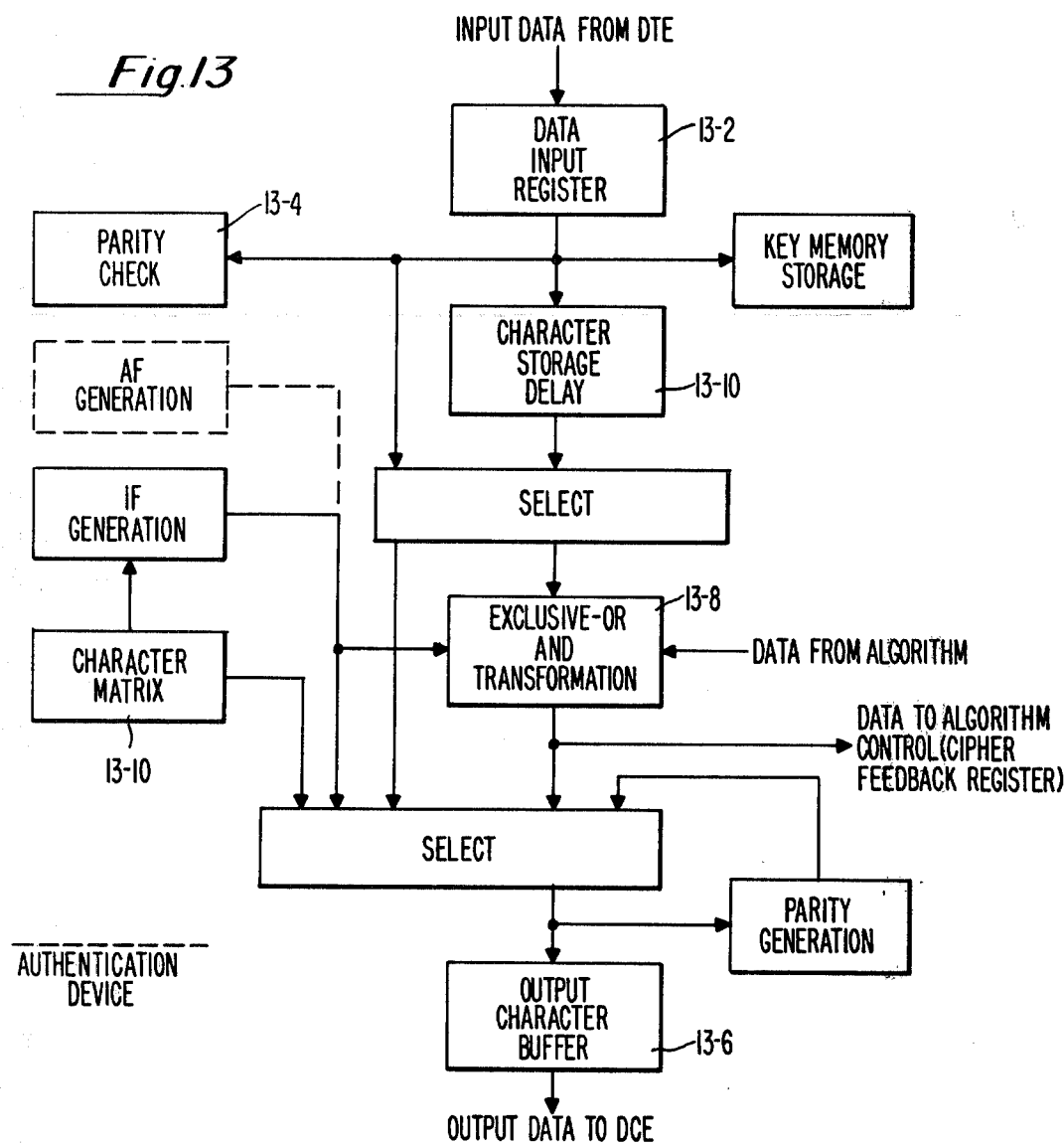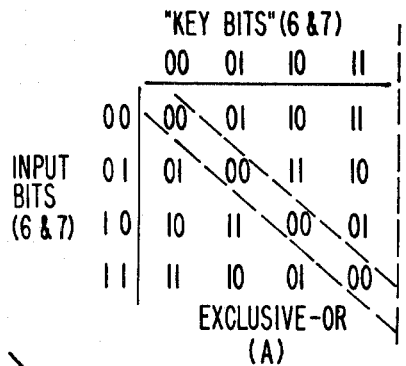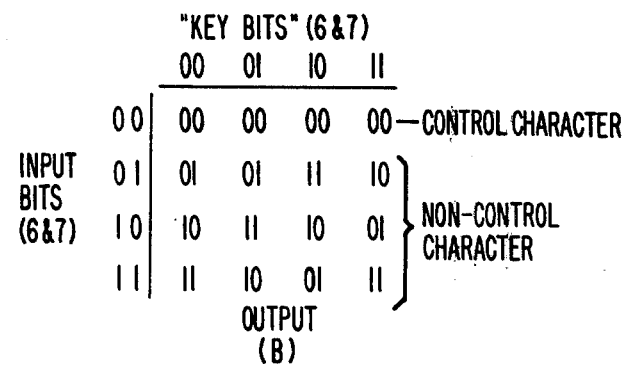
Fig.13
Fig.10

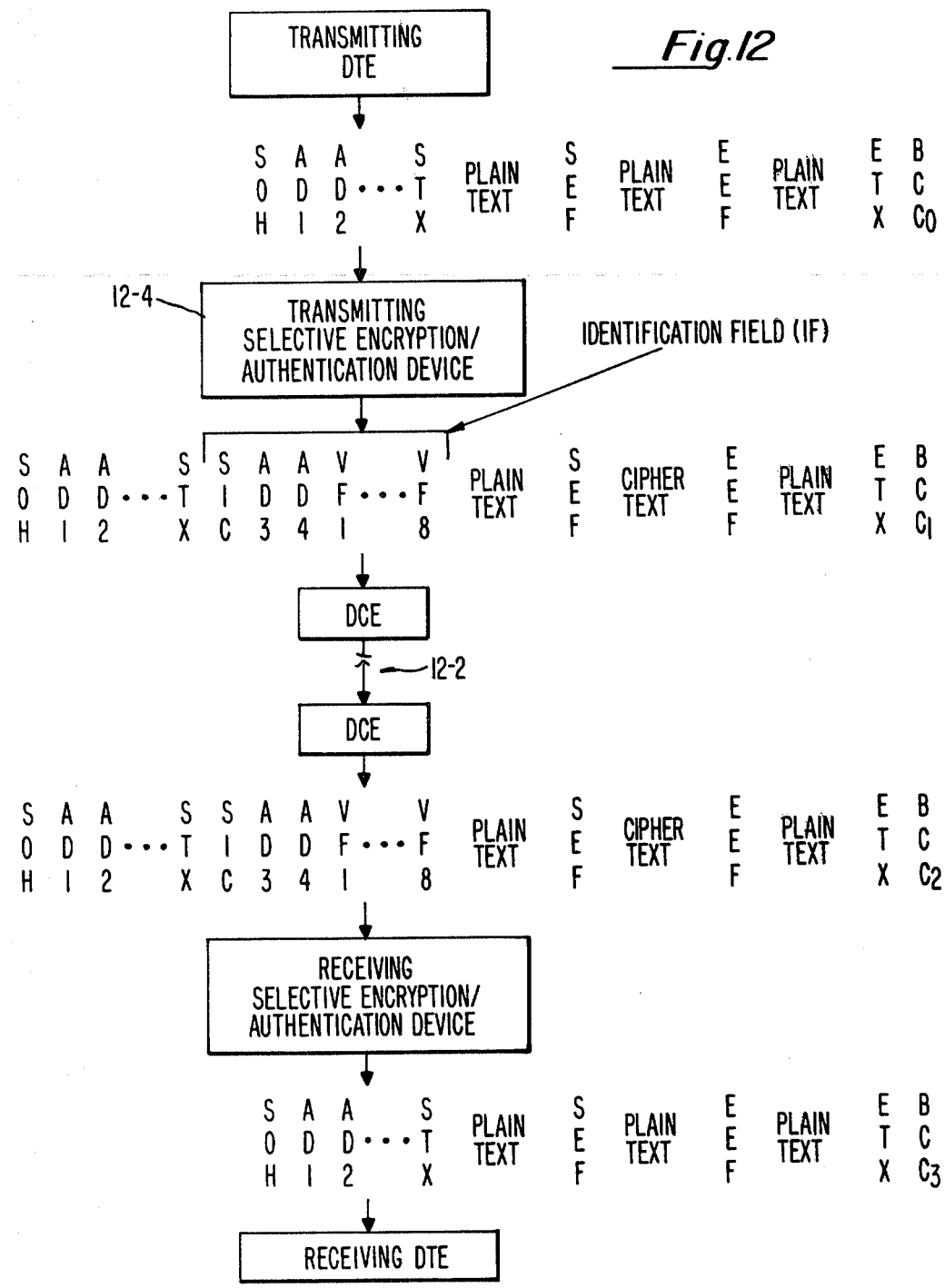

AD1, AD2 INDICATE RECEIVING DTE
SIC = SELECTIVE IDENTIFICATION CHARACTER = 1111101
AD3, AD4 INDICATE TRANSMITTING DTE
[ ] = OPTIONAL CHARACTER THAT INDICATES THE STATE OF AUTHENTICITY OF THE MESSAGE
VF1-VF8 = VARIABLE FILL CHARACTERS

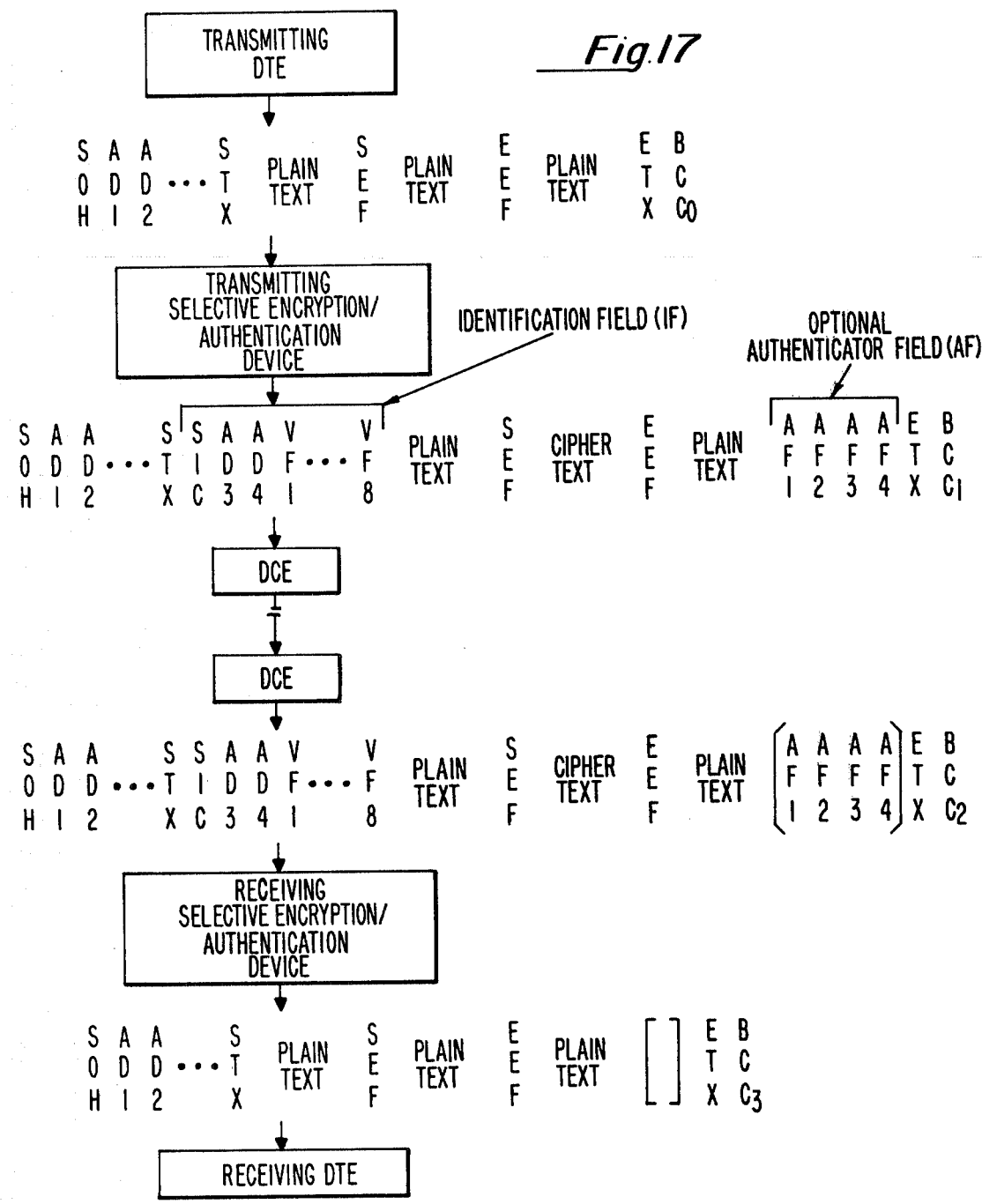

LINK ENCRYPTION DEVICE

CROSS-REFERENCE TO RELATED APPLICATIONS

Reference is hereby made to two utility applications entitled BYTE STREAM SELECTIVE ENCRYPTION/DECRYPTION DEVICE, Ser. No. 852,444, and COMMUNICATIONS LINE AUTHENTICATION DEVICE, Ser. No. 852,446, by the same inventors as the instant invention and filed concurrently with the instant application, and to a design application entitled DATA ENTRY KEYBOARD by Jerry Joseph Sims et al, Ser. No. 835,840, filed Sept. 22, 1977.

BACKGROUND OF THE INVENTION

The present invention relates generally to the art of cryptography and more specifically to hardware and techniques for achieving data communications security.

With the growing use of remote communications lines to transfer data between data processing systems, between terminals and remote data banks, and between terminals connected to the same or different computers, the need to safeguard the data being transferred has grown. In the banking industry, there is a growing need to prevent the fraudulent modification of "electronic money" in electronic funds transfer. Similar needs exist in business to prevent the disclosure of sensitive data. In the government sector, present and/or future privacy acts place restrictions on the ability to access sensitive information. This need to safeguard sensitive information is likely to grow as future privacy legislation will most probably impose data communications security requirements on the private sector.

Previous efforts to safeguard data communications have been made, for example, in U.S. Pat. No. 3,798,605, issued Mar. 19, 1974, which pertains to a multi-terminal data processing system having means and process for verifying the identiy of subscribers to the system. Validity of a terminal request for communications with the data processing system are determined on the basis of a centralized verification system. Each subscriber to the system is identified by a unique key binary signal pattern. The central data processing unit contains a listing of all valid keys for subscribers to the system. Two embodiments of the centralized verification system are presented, a password system and a handshaking system. In the password system, all data or information originating at the terminal under use of the subscriber is enciphered in combination with the unique subscriber key. Upon proper deciphering of the key or password at the central processing unit and arriving at a match with one of the keys in the processor's listing, the subscriber may communicate with the processing system. In the handshaking system embodiment the user and the central processor exchange a plurality of messages each formed by a combination of new and prior received data. Received data messages are also maintained within the registers at both the terminal and the central processor for further verification upon the return of the portion of the message that was previously transmitted. The techniques described in the latter patent have several drawbacks. First, the techniques are restricted to communications between a central processor and terminals attached to the central processor. No provision is available for communications between terminals or for transmitting a message received by, but not intended for, a first terminal to a second terminal which is intended to receive the message. Second, the system enciphers all data and hence is not capable of selective encryption. Third, communications must be initiated by the terminal, and may not be initiated by the central processor. Fourth, the system is not designed for insertion in previously existing communications systems.

Another cryptographic technique to achieve data security is presented in U.S. Pat. No. 3,798,360, issued Mar. 19, 1974, which system provides multiple level encipherment of a block of data by means of a stepped block cipher process. This system suffers from the same drawbacks as previously discussed for U.S. Pat. No. 3,798,605. Further, this system is restricted to operation on blocks of data and is not capable of bit-by-bit encryption.

OBJECTS OF THE INVENTION

It is the general object of this invention to provide a cryptographic system to provide communications security for communications links in point-to-point or multipoint networks without changes to existing hardware or software configurations.

It is another object of this invention to provide link encryption on a bit-by-bit basis in common carrier or direct connect circuit environments.

It is a further object of this invention to provide a cryptographic system, for insertion between a data set and a terminal or central processing unit, which enciphers and deciphers binary data on a bit-by-bit basis.

It is still a further object of the present invention to provide a system to maintain privacy between selected terminals in a data communications network having a plurality of terminals.

It is another object of the present invention to provide a cryptographic system which enciphers binary data on a bit-by-bit basis into an enciphered data that is not susceptible to successful cryptoanalysis.

It is still another object of the present invention to provide a cryptographic system that enciphers and deciphers data on a bit-by-bit basis and which is dependent on a key stored in the cryptographic system and data previously received by a cryptographic system.

These and other objects, features and advantages of the present invention will become apparent from the description of the preferred embodiments of the invention when read in conjunction with the drawings contained herewith.

SUMMARY OF THE INVENTION

The foregoing objects of the present invention are achieved by providing a Link Encryption Device (LED) for insertion in an existing point-to-point or multipoint network to provide protection of data on the data communications lines. A LED is installed at each end of a link and is transparent to the data communications procedures employed. The LED encrypts and decrypts data on a bit-by-bit basis. Encrypted data is always sent on the communications line between originating and destination points of the link, thus assuring both message integrity and message secrecy since this data is unintelligible to unauthorized listeners and cannot be altered without detection.

The LED has both encryption and decryption capabilities and can function in a full duplex environment to encipher and transmit data bits received from a first direction, and decipher and transmit data bits received from a second direction.

The LED receives data from the communications line on a bit-by-bit basis. As a plain text data bit is received from the first direction, it is enciphered by logically combining the plain text data bit with a key bit produced by a key bit generator, the key bit generator output being responsive to the next previous produced bit of enciphered data and a unique key entered in the key bit generator by the user. Thus, after the plain text data bit received from the first direction has been logically combined with the key bit, the resulting enciphered data bit is transmitted back onto the communications line in the first direction and fed back to the input of the key bit generator for use in generating another key bit which will be used to encipher the next bit of plain text data received by the LED from the first direction.

Data bits received from the second direction are deciphered using equivalent elements as used for enciphering, the basic difference in the operation of the LED being the point from which the data fed back to the key bit generator is taken.

In order to assure that the plain text data bits enciphered and transmitted by a first LED produce the equivalent plain text data bits after being received and deciphered by a second LED, two requirements must be met; the unique key entered by the user in the LEDs must be the same and the initial inputs to the key bit generators in each LED must be the same. The synchronization of the transmitting and receiving LEDs is achieved by transmitting the set of initial inputs to the transmitting LED's key bit generator register to the receiving LED prior to transmitting any enciphered data bits.

BRIEF DESCRIPTION OF THE DRAWINGS

FIG. 1 is a block diagram of the data encryption standard used in the preferred embodiment of this invention.

FIG. 3 is a functional diagram showing the transmitter cipher feedback register run as a shift code counter.

FIG. 4 illustrates typical point-to-point and multipoint networks utilizing the SE/AD in link encryption mode.

FIG. 5 shows a typical end-to-end mode communication network configuration with multiple nodes and a variety of links containing a mixture of terminals and processors.

FIG. 8 illustrates the modem delay compensation circuitry utilized in both the transmit and receive operations.

FIG. 9 is a functional block diagram of the SE/AD in the end-to-end selective encryption mode of operation.

FIG. 10 illustrates the translation performed on control characters.

FIG. 12 shows the message flow in a communication network that utilizes the SE/AD in the end-to-end selective encryption mode.

FIG. 13 is a simplified block diagram of the transmit processing operation.

FIG. 17 shows the message flow in a communication network which combines the selective encryption message flow and the authentication message flow into a system containing both modes of operation.

DETAILED DESCRIPTION OF THE PREFERRED EMBODIMENT

Figure 2:
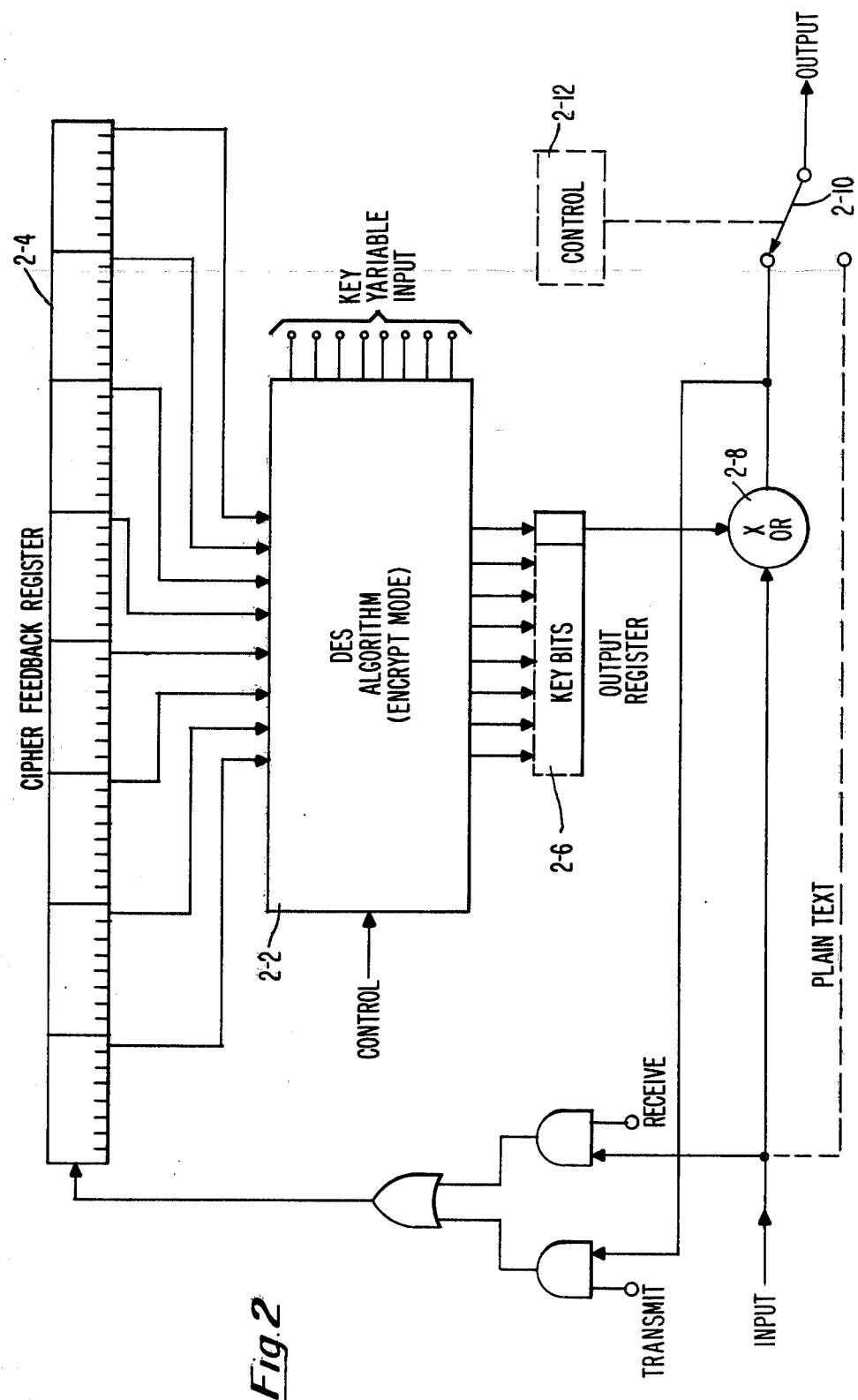
FIG. 2 is a functional diagram of the cryptographic technique utilized in the selective encryption/authentication device.

Throughout this description and in the accompanying drawings, the following terms and expressions will be utilized in accordance with the following definitions:

Algorithm: A prescribed set of well-defined rules or processes for the solution of a problem in a finite number of steps.

Authentication: The process of appending crypto check digits to a plain text message by means of a Crypto System where the Crypto check digits are generated by Encryption of the entire plain text message.

Cipher Feedback: A technique in which the key generated is a function of the preceding cipher.

Cipher Text: The unintelligible form of information resulting from Encryption of plain text by a Cryptosystem.

Cryptographic System (Cryptosystem): The associated items of documents, devices, or equipment that are used as a unit, and provide a single means of encryption. (The term "Encryption" used in this specification implies the capability of the inverse function, i.e., "Decryption".)

Crypto-Unit: That portion of a Cryptosystem where the actual Encryption and Decryption takes place.

Decryption (Decipherment): The process of converting encrypted text into its equivalent plain text by means of a Cryptosystem.

Encryption (Encipherment): The process of converting plain text into unintelligible form by means of a Cryptosystem.

End-To-End Selective Encryption/Authentication: Encryption of authentication in point-to-point multipoint networks to provide protection of data on the data communication line and within interspersed message switches or concentrators.

Garble: Unintelligible information caused by a modification to a cipher bit(s).

Key: Bits generated by a crypto unit under control of the key variable which are logically combined with plain text to form unintelligible information i.e., cipher text, or inversely, logically combined with cipher text to produce the original plain text.

Key Variable: A symbol, or sequence of symbols (or electrical or mechanical correlates of symbols) which control the operations of encryption and decryption (e.g., a finite length bit pattern).

Link Encryption: Encryption in point-to-point or multipoint networks to provide protection of data on the data communications line.

Message Integrity: A message in which the data is receives at the proper destination exactly as sent by the originator, i.e., without any changes or tampering.

Message Secrecy: A message in which the data is incomprehensible to any viewer or listener from the time it leaves the source until it arrives at the proper destination.

Plain Text: Intelligible text or signals which have meaning and which can be read or acted upon without the application of any decryption.

Selective Encryption: The process of converting portions of plain text which are delineated by selected character(s) into unintelligible form by means of a Cryptosystem.

Variable Fill: A random bit pattern provided as the input to the algorithms of both transmit and receive crypto units during initialization.

Data Encryption Standard: The Data Encryption Standard (DES) is an algorithm released by the National Bureau of Standards in the Federal Information Processing Standards Publication (FIPS Pub) 46-Jan. 15, 1977, and is intended for use as an industry standard. It was designed for 64-bit block data operation. The key variable is 56 bits in length and is loaded into the algorithm before the encryption/decryption process is initiated. In the encrypt mode the algorithm produces 64 bits of cipher text for each 64 bits of input plain text. Conversely, in the decrypt mode if these 64 bits of cipher text are provided as the input, the algorithm will produce the original 64 bits of input plain text. The Data Encryption Standard is incorporated by reference in this specification. Additional description of the Data Encryption Standard is also presented in U.S. Pat. Nos. 3,796,830 and 3,798,359, issued Mar. 12, 1974 and Mar. 19, 1974, respectively.

FIG. 1 is a block diagram of the data encryption standard. As shown, the implementation of the data input and data output is provided in 8-bit bytes. The key input is entered in 8-bit bytes: 7 bits plus parity. Parity is not stored in the key storage register.

Twenty-four clock periods are required to load the data input. Data output is simultaneously available during this period. Sixteen iterations of the algorithm at two clock periods per iteration, require an additional 32 clock periods, giving a total of 56 clock periods needed for a complete algorithm load and run cycle. At the system clock of 1.2288 MHz, the algorithm is cycled in 45.6 μ seconds.

FIG. 2 is a functional diagram of the cryptographic technique utilized in the Selective Encryption/Authentication Device (SE/AD). Operation of the algorithm unit (DES) 2—2 is described, supra, and is shown only to indicate the required interconnections. In this discussion, the algorithm is only operated in the encrypt mode and is being utilized as a key generator. This technique operates on the principle that "plain text" exclusive-ORed with "key" produces cipher, and conversely that "cipher" exclusive-ORed with "key" produces the original plain text.

The algorithm was designed to operate on 64-bit blocks of input data; however, it can be operated (i.e., cycled through the required 16 interactions) on any number of input bits up to this maximum of 64 bits. As shown in FIG. 2, the algorithm 2—2 is being cycled once for each data input bit. Each time a data input bit is transferred into the 64-bit input register 2-4, the entire contents of this register 2-4 are transferred into the algorithm 2—2. Although 64 key bits are produced each cycle and are available at the output, only a single key bit is utilized and the other 63 key bits are ignored. Also shown in FIG. 2 within the dotted lines in an 8-bit output register 2-6. If the input to the algorithm is provided as a single character, or 8-bit byte, and then cycled, an 8-bit byte of key bits can be provided as the output. It is important to note that with a fixed key variable, for a given pattern of 64 algorithm input bits, a given pattern of 64 output, or key bits is always generated.

Shown at the top of FIG. 2 is a 64-bit shift register called the cipher feedback register 2-4. In the transmit mode as each input plain text bit is exclusive-ORed with a key bit by exclusive-OR 2-8, the resultant cipher bit is sent as the output bit and simultaneously entered into the cipher feedback register 2-4. Thus the input to the algorithm unit 2—2 which produces key bits is the last 64 bits of the output cipher bit stream.

In the receive mode, the system operates in a similar manner. In this instance the input to the unit is the same cipher bit stream produced at the transmitter output. Since this information must be decrypted, the cipher bit stream is entered directly into the cipher feedback register 2-4 as shown. Hence, the input to the algorithm 2—2 is the last 64 input cipher bits. By performing the inverse operation of exclusive-ORing the cipher bits with the identical key bits as were generated in the transmitter, the original plain text is provided as the receiver output.

In order for the encryption/decryption process to proceed without error, or garble, the bit patterns in the cipher feedback registers 2-4 of both transmitter and receiver must be identical when generating the key bit to produce the cipher bit from the incoming plain text bit in the transmitter, and to produce the original plain text bit from the incoming cipher text in the receiver.

The method of ensuring that the transmitter and receiver are in synchronization is to randomly preset the cipher feedback register 2-4 in the transmitter to some bit pattern and precede the output cipher text message with these 64 preset bits. The receiver would place the first 64 bits received into its cipher feedback register 2-4 as the initial preset before running the algorithm to produce the same key bits which are then processed with the incoming data. This initialization technique is called variable fill.

Variable fill refers to the bit pattern, or fill, to which both the transmitter and receiver cipher feedback registers 2-4 are set before processing input plain text in the transmitter and cipher text in the receiver.

When not in the transmit mode, the transmitter cipher feedback register 2-4 is run as a 49-bit shift code counter driven by the recursion $X_8 = X_{41} \oplus X_{56}$ shown in FIG. 3. The preset to the shift code counter is the cipher residue remaining from the last transmission. This assures that the preset to the counter is also random in nature.

Whenever a variable fill is required, the transmitter cipher feedback register 2-4 is returned to its normal operation: the shift code counting is inhibited; the algorithm unit 2—2 is re-enabled; and the register 2-4 is operated at the selected input data rate. The input plain text data line is held in the mark condition and is exclusive-ORed with the key bits which are being generated as a result of the random bit pattern contained in the cipher storage register 2-4. A space is placed on the output data line and the operation proceeds as described, supra, for a predetermined number of bit times, i.e., cipher text is generated and sent as a variable fill as the transmitter output and simultaneously fed back as the input to the cipher feedback register 2-4. After the selected number of bits have been transmitted, the remainder of the bit positions in the cipher feedback register 2-4 are reset to zero, and the unit starts to process incoming plain text data as described previously.

Operation of the receive unit is triggered by the detection of a mark-to-space transition. Following this transition, the incoming data is processed as described previously. However, the output data is inhibited. The incoming variable fill is entered into the cipher feedback register 2-4 for the predetermined number of bits and when completed, the remainder of the cipher feedback register 2-4 is reset to zero.

At this point, the receiver cipher feedback register 2-4 contains the identical bit pattern as that contained in the transmitter cipher feedback register 2-4 when it started to process the incoming plain text data. Hence the receiver will at this point in time begin to process the incoming cipher text data to produce the original plain text data as its output.

As explained previously, for a given key variable the algorithm 2—2 will always produce the identical 64 output key bits for a given 64 input bits. In the operation just described, since the same cipher bit stream provides the input to the algorithms 2—2 in both the transmitter and receiver units, as long as they are in synchronism the input plain text at the transmitter will be faithfully reproduced as the output of the receiver. Also, if for any reason the bit streams in the cipher feedback registers 2-4 are not identical, the receiver output will be garbled. However, if this is a transient condition, the garble will clear up in a maximum of 64 bit times since the inputs to both cipher feedback registers 2-4 are taken from the same functional point. Thus, the use of this cipher feedback method of operation provides a means for automatically resynchronizing the transmitter and receiver under normal operating conditions.

The description up to this point has only considered the Selective Encryption/Authentication Device as an encryption unit. In the transmitter, the input plain text bits, or bytes, are exclusive-ORed with the key bits from the algorithm 2—2 to produce the cipher text output. In some systems where message secrecy is unimportant or plain text is required for operational reasons, a method of assuring message integrity can be employed which is called authentication.

Authentication is a process in which plain text data is sent in the clear, but to which is appended an authentication field in the form of crypto check digits. These crypto check digits, four hexadecimal digits, are generated by processing the entire plain text message in an identical manner as was done when encrypting and transmitted as four bytes.

At the bottom right of FIG. 2 a switch 2-10 is shown together with a method of external control 2-12. When utilized for authentication both the transmitting and receiving encryption/decryption devices are operated in the transmit mode. Input plain text is processed by means of the same algorithmic calculation as done when encrypting; however, the cipher text generated is not sent as the output. Under external control 2-12, the switch 2-10 is set to transmit the incoming plain text while this same plain text is simultaneously applied to the algorithm 2—2 via the cipher feedback register 2-4. At the end of the plain text message, the switch 2-10 is activated to the upper position and the residue (key bits) are appended to the message.

The same processing of the plain text input occurs at the receiving destination. At the end of the plain text message, the receiving device compares the residue left in the algorithm 2—2 with the received crypto check digits. An exact comparison indicates that the received message is identical to that sent by the originator.

Hence as shown in FIG. 2, the output of the transmitting data security device can be switched by means of switch 2-10 under external control 2-12, between the input plain text, or the cipher text generated within the unit by this input plain text. The operation of the algorithm unit 2—2 is fixed in either case since it is independent of the externally controlled switch 2-10.

In addition to the authentication technique just described, extension of the switch control 2-12 to allow a mixture of plain and cipher text as the transmitted output enables the data security device to become a selective encryption device. The algorithmic calculation is continuously made on the incoming plain text, but the output is switched back and forth between plain and cipher text depending on the external control 2-12.

The Selective Encryption/Authentication Device can be operated in two basic modes, selection of the mode of operation being determined by an internal connection. When utilized in the link encryption mode, the device operates on a bit-by-bit basis and is transparent to character codes and communications protocols. In any of the end-to-end modes, the device is sensitive to communications protocols and character codes. Within the end-to-end mode, selection can be made to use the device in selective encryption, authentication, or selective encryption with authentication operation.

The Selective Encryption/Authentication Device operates in the link encryption mode in point-to-point or multipoint networks to provide protection of data on the data communications lines. FIG. 4 shows typical point-to-point and multipoint networks utilizing the device in the link encryption mode.

In link encryption mode, a Selective Encryption/Authentication Device is installed at each end of the link and is transparent to the data communication procedures employed. The device encrypts and decrypts data on a bit-by-bit basis. Encrypted data is always sent on the communication line between originating and destination points of the link thus assuring both message integrity and message secrecy, since this data is unintelligible to unauthorized listeners and cannot be altered without detection.

In the preferred embodiment, selectable connections are provided for either synchronous or asynchronous operation as follows:

2-wire or 4-wire communication lines
up to 19.2K bps Half Duplex
up to 9.6K bps Full Duplex The interface to the Data Terminal Equipment (DTE) is always EIA STD RS-232-C/CCITT V.24 and V.28. The international equivalent of EIA STD RS-232-C is CCITT V.24 (Functional Requirements) and V.28 (Electrical Signal Characteristics). One of three output interfaces to the Data Communication Equipment (DCE) can be selected in the preferred embodiment:

EIA STD RS-232-C/CCITT V.24 and V.28
A-BDI, Burroughs Direct Interface
MIL-STD-188C.

A more detailed description of the link encryption mode of operation is given in the discussion of Link Encryption Operation, infra.

The Selective Encryption/Authentication device will operate in any of the end-to-end modes in point-to-point or multipoint networks to provide protection of data on the data communication lines, and within message switches, or concentrators. In this mode of operation, data messages are encrypted, or authenticated, at the originating point and are not decrypted until the message reaches its ultimate destination point. Message integrity, and where applicable message secrecy, is maintained as the data traverses the network. This technique is called end-to-end encryption, or authentication, and requires that the message header which contains the routing, priority, and other network information not be encrypted. Hence, in this mode the security device must be sensitive to the data communication protocol of the network.

In the preferred embodiment, the Selective Encryption/Authentication Device is compatible with Basic Communications Procedures, Burroughs Corporation Specification 1284 9006, and Binary Synchronous Communications Procedures, Burroughs Corporation Specification 1284 9002. Operation within these procedures will be described next. Since these procedures are character oriented, the device is 8-bit byte oriented and can be considered a character stream encryption/decryption unit. The operating technique is the same as in the link encryption mode except that data is accumulated in 8-bit bytes, or characters, on both input and output. Operation of the algorithm unit 2—2 within the device is performed on a character basis, hence the device is capable of faster operation in the end-to-end mode than in the link encryption mode which operates on a bit basis.

FIG. 5 shows a typical communication network configuration with multiple nodes and a variety of links containing a mixture of terminals and processors. In this mixed environment, only those terminals which require data security are equipped with Selective Encryption/Authentication devices. A key variable memory storage option can be implemented within each of these devices to provide a specific key variable between designated terminals and processors. Message switches and concentrators pass along all data messages to the addressee excatly as received.

As shown in FIG. 5, not every terminal installation has a Selective Encryption/Authentication device. Data communication between all terminals in the network will be maintained nevertheless, since the device only encrypts, or authenticates, messages for which the key variable of either origination or destination points is stored within the device. If this key variable is not stored within the device, it will be transparent to the input message and will pass it along exactly as received.

In the preferred embodiment, selectable connections are provided for either full or half duplex operation as follows:

2-wire or 4-wire communication lines
  Synchronous data rates up to 64 K bps
  Asynchronous data rates up to 19.2 K bps.
  The DTE interface is EIA Standard RS-232-C.
  One of three output interfaces to the DCE can be selected:
  EIA Standard RS-232-C
  A-BDI, Burroughs Corporation Direct Interface Standard
  Mil-STD-188C.

Detailed descriptions of all end-to-end modes are given in the remainder of this specification.

In the preferred embodiment, the Selective Encryption/Authentication Device is compatible with BASIC Communications Procedures (Burroughs Corporation Standard 1284 9006) and Binary Synchronous Data Communication Procedures (Burroughs Corporation Standard 1284 9022), and will operate on a "drop-in" basis in networks employing either of these procedures. However, alternate embodiments compatible with other data communications procedures would be obvious to those skilled in the data communication art.

In the transmit mode the device is sensitive to messages which begin with a start of header (SOH) character, and the message text is delineated by start of text (STX) and end of test (ETX) characters. The device is transparent to plain text input messages not in this format. A further restriction is placed on the message format by the requirement that in order for the encryption/authentication process to be initiated, the two-character sequence immediately following SOH must contain the address, AD1-AD2, of the destination point, i.e., "YOU ARE". If the key variable for this address is not stored within the device, the input message will be passed along as received from the originating processor or DTE.

For single-terminal installations with only one stored key variable, the device operates with the terminal address, "I AM", rather than the destination address.

Likewise in the receive mode, the device is transparent to all input messages except for messages beginning with SOH, and the message text delineated by STX and ETX characters. However, the decryption/authentication process is initiated in the receiver by the presence of a valid identification field which contains the address, AD3-AD4, of the origination point, i.e., "I AM". If the message does not contain an identification field, or if the key variable for the origination point is not stored within the device, the input message will be passed along as received from the DCE. The identification field will be discussed below.

It should be noted that in the preferred embodiment, in both transmit and receive modes, all other messages except those described above will be passed along as received including communication control procedures, e.g., poll sequences or acknowledgements. Special handling of control characters, i.e., characters with "0" in bits 6 and 7, will be discussed in detail below.

In block transmissions ETB will be treated as if it were an ETX. Also ITB and the ENQ abort sequence will be ignored in the device.

In end-to-end selective encryption operation, the message integrity is assured between origination and destination points, regardless of the number of nodes that the message traverses. In this mode, the secrecy of the message is determined by the originator of the message. As was explained above, the cryptographic technique employed in the Selective Encryption/Authentication Device permits the data output to be switched between cipher text and plain text under external control. This control is provided by the originating DTE. The device will nominally begin the encryption process on the detection of STX, and end the process on the detection of ETX. Starting with the first data character following STX and continuing until the last data character before ETX, each character is encrypted and the resulting cipher text transmitted as the output.

In this mode, the device can also be made sensitive to a series of control sequences provided by the DTE. These control sequences are one or two control characters which place the device in an out of the encryption mode. Any number of these sequences can be entered between the start, STX, and end, ETX of the message. Hence, the device can selectively encrypt selected portions of the message and leave other portions to be transmitted in plain text.

In communication networks using end-to-end authentication operation the message is required to be in plain text as it passes through the various network nodes. In these systems, message integrity is assured by appending an authenticator field (AF) to the message text. Operation in this mode utilizes the same cryptographic technique as in end-to-end selective encryption with the exception that the entire data input message, from STX to ETX, is transmitted in plain text rather than the generated cipher text. After the last data input character has been transmitted in plain text, a portion of the residue, i.e., key bits, within the algorithm is appended to the message as an authenticator field. Sixteen key bits make up this AF and are transmitted as four 8-bit bytes. The format of these bytes is given below.

The end-to-end selective encryption with authentication mode combines the capabilities of the end-to-end selective encryption and authentication modes. Operation is the same as for the selective encryption with an AF appended to the message. This guarantees message integrity in systems where the last part of the message was sent in plain text.

LINK ENCRYPTION OPERATION

Figure 6:
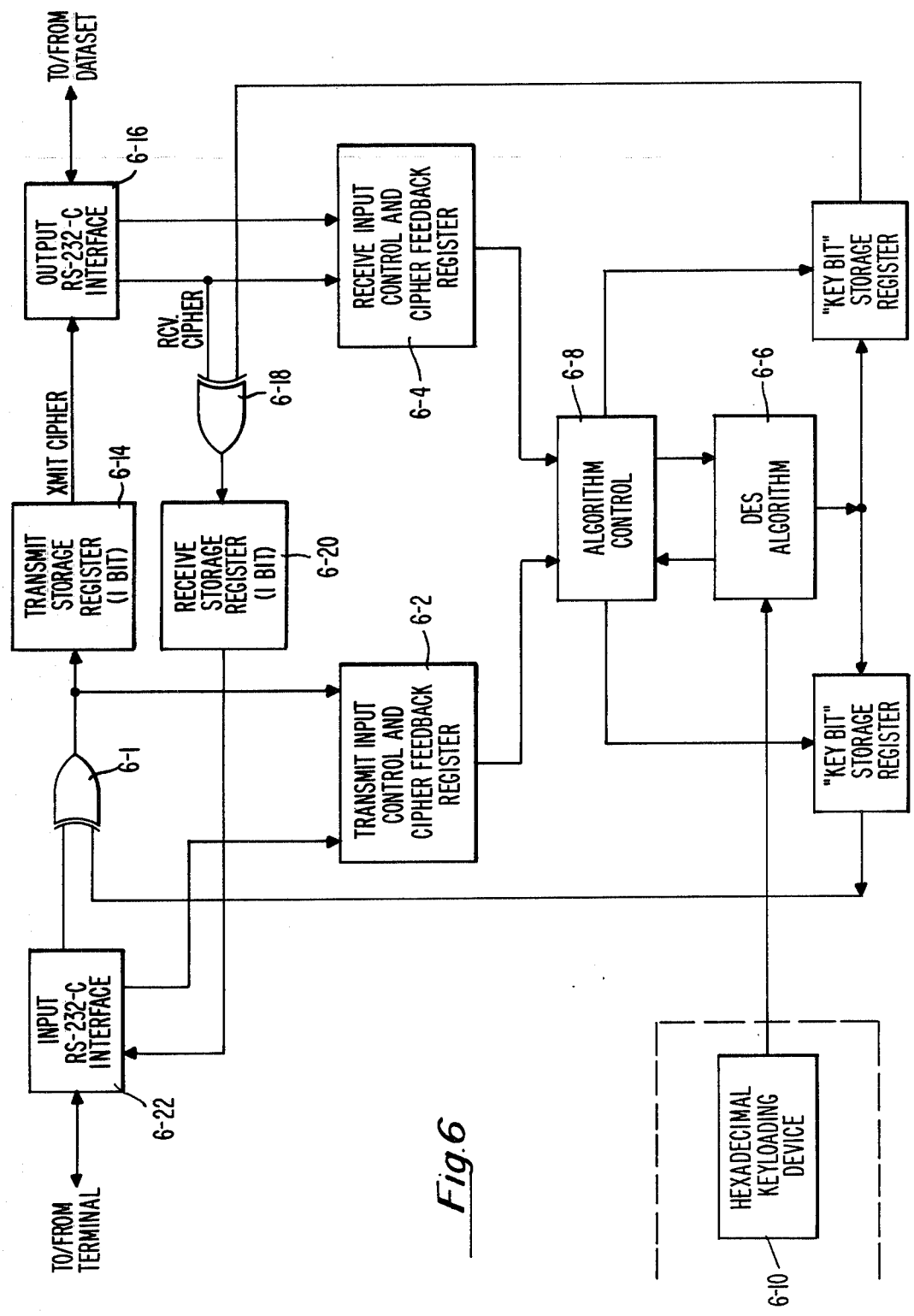
FIG. 6 is a functional block diagram of an SE/AD in the link encryption mode of operation.

FIG. 6 is a functional block diagram of a device in the link encryption mode of operation. The device is designed for full duplex operation with independent transmit and receive sections including separate 64-bit cipher feedback registers 6-2,4 in both transmit and receive stations. A single DES algorithm module 6—6 and algorithm control module 6-8 are time shared to perform both transmit and receive functions simultaneously.

As shown, an external hexadecimal keyloading device is used to enter the key variable directly into the algorithm module 6-6 before the device is ready for operation.

In synchronous mode with a constant carrier environment, the device is constantly running at the selected bit rate regardless of the state of the input data line from the DTE. Every bit time, the input data and key bit are exclusive ORed 6-1 and the resultant cipher bit is entered into the transmit cipher storage register 6-2, and also placed into a flip-flop transmit register 6-14 which controls the output RS-232-C interface 6-16 to the dataset. Conversely, the cipher data bit which is received from the output interface 6-16 is entered into the receive cipher storage register 6-4, and is also exclusive ORed 6-18 with a key bit, with the resultant plain text bit placed into a flip-flop receive storage register 6-20, which controls the input RS-232-C interface 6-22 to the DTE.

As previously explained, a given 64-bit input pattern to the algorithm 6—6 with a given key variable will always produce a fixed 64-bit output pattern of key bits. In the link encryption mode only one of these bits is utilized and the other 63 bits ignored. The input bit pattern to the algorithm 6—6 is always obtained by loading the contents of either the transmit 6-2, or the receive 6-4 cipher storage registers as required. Once the Selective Encryption/Authentication Devices at both ends of the link become synchronized, i.e., the bit patterns in the cipher storage registers in both transmitter and receiver are the same, encryption and decryption will proceed on a continuing basis.

When operating in the full duplex mode, the algorithm module 6—6 is shared on an alternating bit basis. The content of the transmit and receive cipher storage registers 6-2,4 is alternately loaded into the algorithm module 6—6 by means of the transmit 6-2, receive 6-4, and algorithm control 6-8 sections such that the proper key bit is generated for the input plain text and the received cipher text at the right time.

The same operation takes place in the half duplex mode except that the transmit and receive cipher feedback registers 6-2,4 are used as required on a message basis. In this mode all messages are preceded with a variable fill to achieve initial synchronization. This will be discussed below.

OPERATIONAL ENVIRONMENTS

In the preferred embodiment, in link encryption mode of operation the device will operate in all classes of data communication service including: dedicated or private line service, two-wire or four-wire, point-to-point or multipoint networks. It will operate in a two-wire or four-wire switched network, but without automatic dialing or answering service.

SYNCHRONOUS OPERATION

In synchronous operation the device normally derives the clock from the DCE. An internal connection is provided to alternately derive the clock from the DTE.

Synchronous speeds up to 19.2 K bits per second can be selected in the half duplex mode of operation. In full duplex operation this speed is limited to 9.6 K bits per second.

ASYNCHRONOUS OPERATION

In the preferred embodiment, the device contains an internal timing generator which allows the selection by means of internal connections of any of the following speeds:
50 bps, 75 bps, 110 bps, 134.5 bps, 150 bps, 200 bps, 300 bps, 600 bps, 1200 bps, 1800 bps, 2400 bps, 4800 bps, 9600 bps, or 19,200 bps.

At these speeds a separate and independent selectable strapping option is provided to handle 5, 6, 7, or 8 data bits per character.

BIT STREAM ENCIPHERMENT

Figure 7:
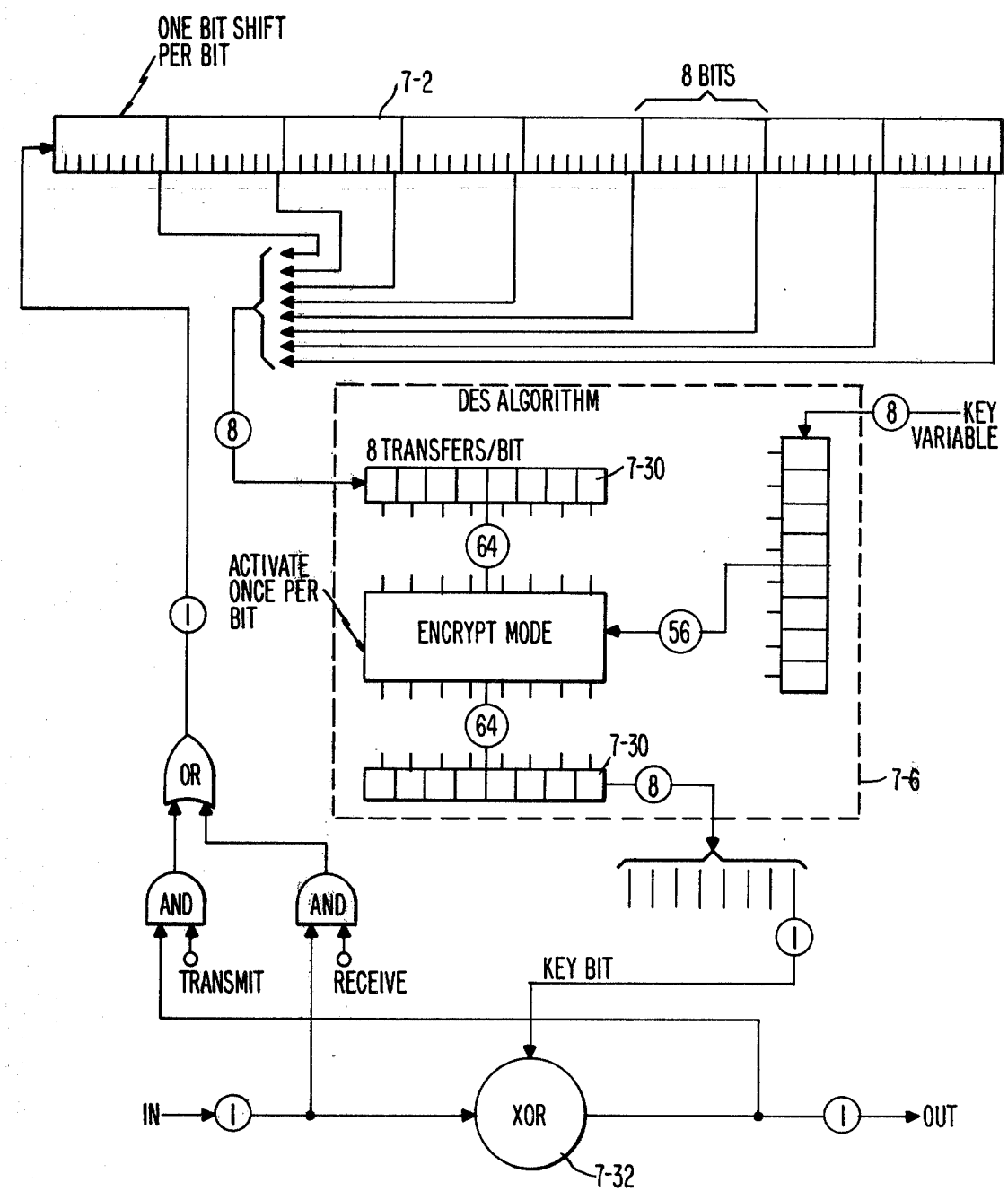
FIG. 7 illustrates the SE/AD as a bit-stream encryption/decryption device operating in the link encryption mode.

FIG. 7 illustrates the Selective Encryption/Authentication Device as a bit-stream Encryption/Decryption Device operating in the link encryption mode. As shown, the device can be used as either a transmitter or receiver, with the only difference being in the point where the cipher is taken to provide the input to the cypher feedback register 7-2. In the transmitter, this is the output of the device, whereas in the receiver the cipher text input is entered directly into the cipher feedback register 7-2. The processing of data is called enciphering in the transmitter, and deciphering in the receiver. This nomenclature is used throughout this specification.

ENCRYPT MODE

Shown within the dashed lines of FIG. 7 is the Data Encryption Standard algorithm 7-6 which is always operated in the encrypt mode, and is utilized as a key generator as previously described. The registers 7-30 shown at the top and bottom of the algorithm are one and the same register (the algorithm data storage register); it is shown duplicated to clarify the description of the input and output operations of the algorithm.

TRANSMIT OPERATION

In the transmit mode, each plain text input bit is exclusive ORed with a key bit and sent as the output cipher bit. Simultaneously, this cipher bit is entered into the cipher feedback register 7-2 which is shifted once per input bit. The cipher feedback register 7-2 is made up of eight 8-bit end-around registers with an output taken from the 8th bit position of each register. These outputs form an 8-bit parallel input to the algorithm data storage register 7-30. As each of these eight cipher storage registers is cycled end around, 8 bits of cipher text are entered into the algorithm data storage register 7-30 each shift. After 8 transfers of 8 bits each, the 64 bits contained in the cipher storage register 7-2 have been transferred into the algorithm data storage register 7-30. The algorithm 7-6 is then activated, i.e., cycled through 16 iterations as explained previously, to produce 64 bits of cipher in the algorithm data storage register 7-30. One of these bits is used as a key bit and the remaining 63 bits ignored. This completes the processing of a single plain text input bit into a single cipher text output bit.

The exact same process is repeated for each succeeding input bit. Hence the content of the cipher storage register 7-2 always forms the input for the algorithm data storage register 7-30 for each generation of a new key bit, to make the output of the transmitter a bit stream of encrypted data, or cipher text.

RECEIVE OPERATION

In the receive mode, the input to the receiver is this steady stream of cipher text which is directed into the cipher feedback register 7-2 on a bit-by-bit basis and provided as the input to the algorithm data storage register 7-30 in the same manner as the transmitter. Since this is the exact cipher which generated the key bits in the transmitter, exactly the same key bits will be generated in the receiver. These key bits are exclusive ORed 7-32 with the incoming cipher to produce the original plain text as the receiver output.

SYNCHRONIZATION

In constant carrier environments no attempt is made to provide initial synchronization between transmitter and receiver. In synchronous constant carrier operation, the transmitter runs continuously to always provide a cipher output, regardless of the information on the data input line from the DTE. Synchronization will be achieved in 64 bit times. In asynchronous constant carrier operation, the same technique for synchronization is used, i.e., it is automatically achieved 64 data bits after character framing takes place. However, in this case the data on the input line, which is framed with start and stop bits, is strobed into the unit after detection of a start baud. In either case, the first 64 bits of data will be garbled before synchronization is achieved.

In controlled carrier environments, all messages are preceded by a variable fill in order to assure that the content of both transmit and receive cipher feedback registers is identical before processing input data. The generation of this variable fill was described previously.

The random bit pattern which forms the preset to the transmitter cipher feedback register is determined by the running time of the pseudo-random bit generator which in this case is the cipher feedback register 2-4 operating as a shift code counter (FIG. 3). Whenever the request to sent (RTS) signal from the DTE is lowered, the cipher feedback register 2-4 is operated as a shift code counter running at the system clock rate, 1.25 MHz., in the preferred embodiment. When the RTS signal from the DTE is raised for the next transmission, the shift code counting is inhibited and the cipher feedback register 2-4 contains a random bit pattern.

In synchronous operation, upon detection of the clear to send (CTS) signal from the data set, the transmitter precedes the variable fill by first placing a "zero" bit, mark to space transmission, on the output. After this bit, the transmitter is returned to normal operation as described, supra. The data input line is held in the mark condition while 24, 48, or 64 bits of variable fill are transmitted depending on the strapping selection. After the last bit of variable fill has been transmitted, the last 16 or 40 bits of the cipher feedback register are reset depending on the number of variable fill bits selected. The CTS signal is raised to the DTE, and the input plain text processed as described previously.

In asynchronous operation, the variable fill is framed by start and stop bits until the selected number of bits have been transmitted. At this time, the CTS signal to the DTE is raised, and input data processed as before.

Operation in the receiver in a controlled carrier environment is initiated after the carrier detect (CD) signal is raised. In synchronous operation, the data input line is sampled for a mark-to-space transition which when detected will enter the next 24, 48, or 64 variable fill input bits directly into the cipher feedback register. Depending on the strap selection, the last 16 or 40 bits of the register are reset simultaneously with this loading, and the receiver output is inhibited. When the selected number of bits have been entered, the receiver returns to normal operation as described supra. In asynchronous operation, the processing is the same except that the start and stop bits are stripped out of the incoming data.

INTERNAL MODE CONTROL

The Link/Encryption Mode has two internal modes of operation; Idle Mode and Encipher/Decipher Mode. In asynchronous communications character framing is performed to extract the start/stop bits from the data so that they are not encrypted. In synchronous controlled carrier environments a method of initiating the encryption process is provided, as well as a means to terminate the encryption process in order to compensate for modem delays.

CHARACTER FRAMING

In asynchronous operation, both transmitting and receiving devices are normally in the idle mode where the input and output lines are in the marking condition. The data input line is monitored for a mark to space transition. When this start bit is detected, it is placed directly on the output line and the device is switched to the encipher/decipher mode. Depending on the strap selection, the next 5, 6, 7, or 8 data bits are encrypted or decrypted in the normal manner. After the last data bit is encrypted or decrypted, the device is returned to the idle mode. The output line is held in the mark condition and the input line is monitored for the next start bit. Start or stop bits are never encrypted or decrypted.

MODEM DELAY COMPENSATION

In synchronous controlled carrier operation, the transmitter enters the encipher mode upon detection of the CTS signal and places a single "0" bit (space) on the output line before transmission of data. The receiving device which is in the idle mode, detects this mark to space transition and enters the decipher mode.

Due to modem operational characteristics, a difference in time exists between the end of the transmitted data and the lowering of the RTS signal, and the end of the received message and the CD signal being lowered. This causes the receiver to pass along to the receiving DTE one or more spuriously decrypted mark bits at the end of the plain text message.

To eliminate this possible occurrence of spurious data, modem delay compensation circuitry is included in both the transmit and receive devices as shown in FIG. 8. It consists of monitoring the plain text input at the transmitter and plain text output of the receiver for the occurrence of sixteen contiguous "1's", or marks.

Regardless of when the transmitter drops the RTS signal, the Selective Encryption/Authentication Device holds up the RTS signal to the modem until after sixteen "1's" of input plain text have been encrypted and the resulting sixteen bits of encrypted data are sent as output cipher. Included in the sixteen "1's" are any marks (1's) which might occur from the last data bit of the message input to the dropping of the RTS signal from the DTE. After the sixteenth encrypted "1" is sent, the device goes into the plain text mode, holds the modem transmit data line in the marking condition, and drops the RTS signal to the modem.

At the receiver, the plain text output is constantly monitored for the occurrence of sixteen "1's". When detected, the device goes into the plain text mode and passes the marking of the modem receive data line to the DTE. When the CD signal from the modem is lowered, the device holds the receive data line to the DTE in the marking condition. This eliminates spurious data that would have been generated by the link encryption device at the end of the message.

If the communication procedures are implemented such that the DTE holds the RTS signal high after transmitting a message so that it will be ready to transmit the next message rapidly, the transmitter will go through a procedure similar to that described above. The sixteen "1's" of input plain text are detected, sent out encrypted, and the device goes to the plain text mode. However, the RTS signal to the modem is still held high. The next mark-to-space transition detected on the input plain text line is sent out unencrypted, and the device is placed in the encipher mode to process incoming data in the normal manner.

The receiving unit operates as described previously. In the synchronous controlled carrier environment, it always monitors the output plain text for sixteen contiguous "1's". When detected it goes to the plain text mode and awaits the next mark-to-space transition on the input line to go to the encipher (decrypt) mode.

IDLE MODE DETECTION

When in the synchronous controlled carrier environment, additional circuitry is included in the receiving unit to protect against error conditions. For whatever reason, if the reciving unit fails to detect the occurrence of sixteen "1's" in the output plain text it would remain in the encipher/decipher mode. The receiver also monitors the input data line from the modem to detect the occurrence of thirty-two "1's" of input cipher as shown in FIG. 8. Whenever it detects this condition, it goes to the idle mode, that is, awaiting the next mark to space transition for normal operation.

Although one or more messages may be garbled because of this error condition, it prevents the possibility of erroneously invoking the break function. The presence of all marks to the receiver input data could present all "0's" to the receiving DTE.

END-TO-END SELECTIVE ENCRYPTION OPERATION

FIG. 9 is a functional block diagram of the device in the end-to-end selective encryption mode of operation. The same DES algorithm module 9-6 and algorithm control module 9-8 used in the link encryption mode device are utilized in this mode also, and are likwise time shared to perform both transmit and receive functions simultaneously. The device is designed for full duplex operation with independent transmit 9-2 and receive 9-4 sections which includes separate 64-bit cipher feedback registers in both transmit and receive sections.

The hexadecimal keyloading device 9-10 utilized is the same device used in the link encryption mode, and the key variable can be entered directly into the algorithm module 9-6 as before. Also shown is a key variable memory storage option 9-34 which can store up to 64 key variables. When this option is implemented, the key variables are entered directly into this storage 9-34 by means of the keyloading device 9-10 before the selective encryption device is ready for operation.

The major difference in this mode of operation is that the device is sensitive to the data communication procedures being used. It is therefore 8-bit, or character, oriented. This character orientation results in expanded transmit and receive processing sections. In this mode message, headers are transmitted in the clear. Only selectable characters between STX and ETX are encrypted. Control characters STX, ETX, SOH, ETB, SYN, and EOT are decoded within both transmit 9-2 and receive 9-4 processing sections to provide necessary control within the device. Also shown in FIG. 9 is a character matrix 9-36 which is time shared between both transmit 9-2 and receive 9-4 sections. This character matrix 9-36 contains strappable characters, e.g., the AD3, AD4 device address, and the selective control sequence characters SEF and EEF.

The algorithm 9-6 output is shown going into a key bit storage register 9-38. Since the device is 8-bit byte oriented, the algorithm 9-6 is operated on a byte basis and 8 key bits are generated during every iteration. These 8 key bits are then exclusive ORed with either the transmit or receive data characters to produce either cipher or plain text, respectively, on the DCE and DTE RS-232-C interface lines. In this mode 8 key bits are utilized from each algorithm 9-6 iteration, and the other 56 bits are ignored. The input bit pattern to the algorithm 9-6 is always obtained from either the transmit 9-2 or receive 9-4 cipher storage register before each iteration.

In all end-to-end modes, every encrypted or authenticated message is always preceded with a variable fill. This assures the both transmit and receive cipher storage registers are in initial synchronization. Hence, the proper key bits are generated to produce the cipher in the transmitter, and the original plain text in the receiver.

When the key variable memory storage option is implemented, the required system key variables are entered into the memory before system operation can proceed. Messages which are to be encrypted or decrypted must always contain the destination or origination address. This address information is contained within the message header, or the inserted identification field (IF) which will be discussed below. The key variable associated with each destination and origination address is determined by searching the memory 9-34 for the selected address for either transmit or receive messages. When located, the key variable is entered into the algorithm module 9-8 before the encryption, decryption or authentication process is initiated.

OPERATION ENVIRONMENTS

In the end-to-end selective encryption mode of operation, the device will operate in all classes of data communication service including: Dedicated or private line service, two-wire or four-wire, point-to-point or multipoint networks. It will operate in a two-wire or four-wire switched network, with or without automatic dialing or answering service.

In the preferred embodiment, the device is compatible with BASIC and BSC Data Communication Procedures. In Asynchronous operation, ASCII character codes will be processed and in synchronous operation either ASCII, or EBCIDIC character codes.

SYNCHRONOUS OPERATION

In synchronous operation, the device normally derives the clock from the DCE. A strapping option is provided to alternately derive the clock from the DTE.

In the preferred embodiment, synchronous speeds up to 64 K bits per second can be selected in either the full or half duplex modes of operation.

ASYNCHRONOUS OPERATION

The device contains an internal timing generator which allows the selection, by means of straps, of any of the following speeds:

59 bps, 75 bps, 110 bps, 134.5 bps, 150 bps, 200 bps, 300 bps, 600 bps, 1200 bps, 1800 bps, 2400 bps, 4800 bps, 9600 bps, or 19,200 bps.

CONTROL CHARACTER TRANSLATION

FIG. 5 showed Selective Encryption/Authentication devices in the end-to-end mode where the message must traverse one or more nodes between originating and destination points. The header of all messages must be in the clear in message switches and concentrates in order to perform routing and other network control functions. These switches and concentrators are sensitive to the data communication procedures which prohibit certain control characters from appearing within the message text.

If the encryption process were allowed to proceed without restriction, the exclusive ORing of the plain text with the key bits could result in a cipher text character which could be any control character, and in turn cause the message switch to be unable to process the message properly. In order to avoid this occurrence, special handling of all control characters is performed within the Selective Encryption/Authentication Device.

All control characters presented at the input of either transmitting or receiving devices are passed along to the output of the device unencrypted. Although these control characters appear on the output line unencrypted, they are enciphered internally within the device and are included in the generation of subsequent key bits.

In both ASCII and EBCDIC code sets, "00" in bits 6 and 7 indicate a control character. FIG. 10a shows the resulting pattern of bits 6 and 7 when the input plain text is exclusive-ORed with key bits 6 and 7 during the encryption process.

Four combinations of plain text input bits and key bits when exclusive-ORed produce "00" in bits 6 and 7 as shown in the diagonal column. As can be seen, in each case the input bits and key bits are identical.

In order to prevent the resulting cipher text from appearing on the output as a control character, a translation is performed which is given in FIG. 10b. As shown, whenever the input plain text is a control character, it is sent to the output unencrypted. When the input bits and key bits are identical, the key bits are sent to the output unenciphered. This transformation is used in both transmitter and receiver since the process is reversible.

MULTIPLE KEY VARIABLES

In any end-to-end mode, the Selective Encryption/Authentication Device is capable of communication with multiple DTEs. Although some single terminal installations communicate with only one destination point (in which case only one key variable is needed), other DTE's may be required to communicate with numerous destination points. Since a unique key variable is usually required for each pair of originating and destination points, the device can optionally provide multiple key variable storage up to a maximum of 64 key variables. The option is implemented on a modular basis and can be either 16, 32, 48, or 64 key variables.

KEY VARIABLE MEMORY STORAGE OPERATION

The key variable memory storage 9-34 provides 80-bit words for each originating or destination point address. Sixteen bits contain the address, and the other 64 bits the key variable assigned to that address. The loading of this memory is accomplished by means of the external hexadecimal keyloading device 9-10 and will be discussed below.

Operation of the memory is by a scan or search method. The addresses stored in the memory are transmit destination addresses, "YOU ARE", AD1-AD2, which appear in the header of messages, and receive origination addresses, "I AM", AD3-AD4, which appear in the IF of the message. When the device is transmitting it detects the AD1-AD2 address following the SOH and searches the memory address section for this address. If the address is found, the associated 64-bit key variable is immediately transferred from the memory directly into the algorithm module 9-6 and the device is ready to begin the encryption process. If the address is not located within the memory, the device will pass the input message along to the output without any modifications.

Similarly in the receiving device, the AD3-AD4 address which appears in the IF is detected, the memory scanned, and the key variable loaded directly into the algorithm module 9-6. If the message does not contain an IF or the AD3-AD4 address is not located in memory, the input message will be passed along to the output without any modifications.

KEY VARIABLE LOADING

In the preferred embodiment, the key variable is loaded into the Selective Encryption/Authentication Device by means of a separate key variable loading device (KVLD). In the link encryption mode, or in devices with a single key variable, the key variable is entered directly into the algorithm key storage register 1-2. When the key variable memory storage option is implemented, the key variable is loaded into the key memory storage unit 9-34.

BYTE STREAM ENCRYPTION/DECRYPTION

Figure 11:
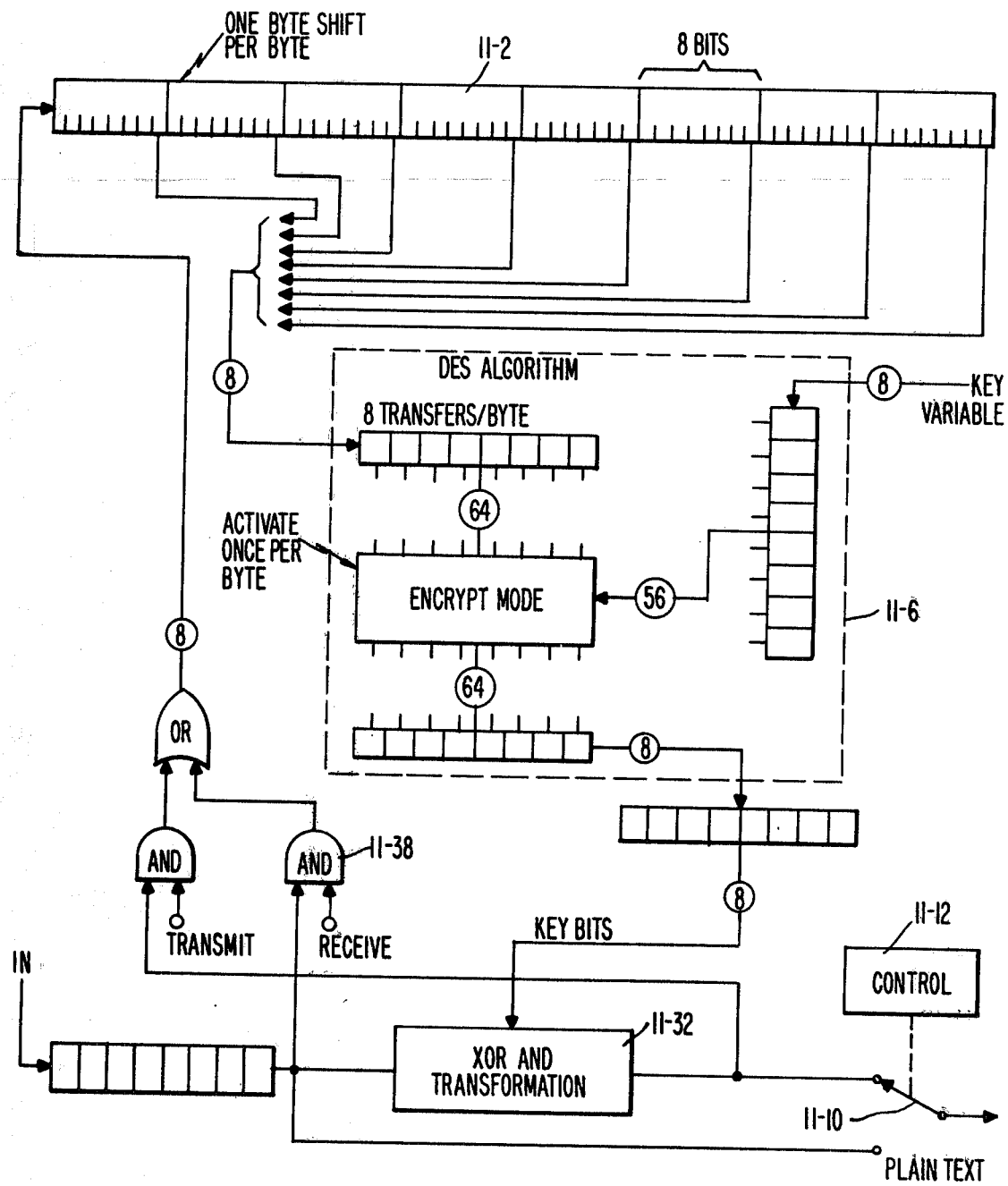
FIG. 11 is a functional block diagram of the SE/AD as a byte stream encryption/decryption device operating in any end-to-end mode.

FIG. 11 illustrates the Selective Encryption/Authentication Device as a byte stream encryption/decryption device operating in any end-to-end mode. Operation is very similar to the link encryption mode device, with the major difference being that the unit operates on a character, 8-bit byte, basis and contains control character translation previously described.

The device can be used as a transmitter or receiver, dependent on which point the cipher is taken to provide the input to the cipher feedback register 11-2. The algorithm 11-6 is always operated in the encrypt mode and acts as a key generator as previously described. In this mode of operation 8 key bits are generated each iteration of the algorithm 11-6 to provide the input to the exclusive OR 11-22 for encryption and decryption. Character translation is done simultaneously within this logical network.

As shown in FIG. 11, the output of the device can be switched between cipher and plain text under external control 11-12. This control sequencing will be discussed below.

In the transmitting device, all data input characters are encrypted in the normal manner by means of the exclusive OR and transformation network 11-32, and provided as the input to the cipher feedback register 11-2 regardless of whether or not plain text is being sent as the output data.

The receiving device is either strapped to receive all encrypted data between STX and ETX, or to be sensitive to control sequencing which allows the input data to be either cipher or plain text. When in the latter condition, the receiving device will pass along all input data as plain text to the receiving DTE until the control sequence is detected. During this period, the receiving device operates exactly as the transmitting device, i.e., the input plain text is also encrypted by means of the exclusive OR and transformation network. The resulting cipher text is entered into the cipher feedback register 11-2, hence the receiver will remain in synchronism with the transmitter. When the control sequence to start receiving encrypted data is detected, the cipher text input is entered directly into the cipher feedback register 11-2 by enabling the receive gate 11-38, and the output switch 11-10 is enabled to provide the decrypted plain text to the DTE.

MESSAGE FLOW

FIG. 12 shows the message flow in a communication network that utilizes Selective Encryption/Authentication Devices in the end-to-end selective encryption mode. Shown in the middle of the drawing is a break 12-2 between the DCE equipments. Located within this break can be any number of network nodes which include message switches or concentrators. Only the Selective Encryption/Authentication Devices shown at each end are required to assure message integrity and secrecy as the message traverses the network.

SYSTEM DELAY

As can be seen in FIG. 12-2, the output message from the transmitting Selective Encryption/Authentication Device 12-4 contains additional data than is provided to the input by the DTE. This added data is called the identification field (IF) and consists of 11 characters. The device processes input characters only after they have been completely entered, hence a one-character inherent delay is present in the transmitter. This one character of inherent delay also exists in the receiving device. Therefore an overall system delay of 13 characters is introduced by the selective encryption mode device. This means that the ETX character of the transmitting DTE arrives at the receiving DTE delayed 13 character times.

As input bit rates above 4.8 K bps, delay is introduced into the system because of the time required to search the key variable storage memory 9-34 and enter the key variable into the algorithm unit 9-6 before the processing can be initiated. The maximum time for this operation is $130\mu$ seconds and the additional delay introduced for this lookup tabulated below.

| K bit/sec | Key Variable Lookup Delay (130 $\mu$sec) (characters) | Total Delay (characters) |
|---|---|---|
| 9,6 | 1.3 | 15 |
| 19.2 | 2.5 | 16 |
| 56.0 | 7.4 | 21 |
| 64.0 | 8.4 | 22 |

A character storage register is provided in the transmitting device to store and temporarily delay a varying amount of characters following STX depending on the input bit rate.

TRANSMIT OPERATION

The transmit operation is initiated by the DTE via the RS-232-C interface 9-40,42 to the Selective Encryption/Authentication Device. The operation of this interface in conjunction with the device output interface to the DCE will be discussed below. Once these interface connections have been established, messages are processed as shown in FIG. 12.

Only input messages that start with SOH will be processed. They must be followed immediately by a destination address, AD1-AD2 for which a key variable is stored within the device, and also the message text must start with STX. Other input messages will be passed along to the output unmodified.

FIG. 13 is a simplified block diagram of the transmit processing operation. Input characters are received from the DTE and placed into an input register 13-2. Character parity is checked 13-4, and the character either passed directly to the output character buffer 13-6, processed with data from the algorithm 13-8, or stored in the character storage delay 13-10. After detection of STX, the IF is generated utilizing the character matrix 13-10 which contains the originating address AD3-AD4. This IF is generated at the system clock rate and stored in the output character buffer 13-6. The character storage delay 13-10 is used to buffer characters at input data rates over 4.8 k bps. A block check character (BCC) is regenerated over the entire output message.

DESTINATION ADDRESS

When operating under 4.8 K bps, SOH is detected and passed to the output for immediate transmission. AD1-AD2 are likewise passed along while simultaneously searching the key storage memory 9-34 for this destination address. The device passes along directly to the output any characters from the input up to and including the STX character. If the destination address was contained in the key memory storage, the associated key variable is entered directly into the algorithm unit 9-6 and the encryption process initiated. If the destination address is not present in key memory storage 9-34, the entire input message is passed along to the output unmodified.

IDENTIFICATION FIELD

Detection of the input STX character initiates the generation of the identification field (IF) which always starts with the insertion of the selective identification character (SIC), ASCII 111 1101, immediately following STX. The next two characters inserted identify the transmitting DTE, AD3-AD4, which are strappable within the unit and contained within the character matrix. Following this originating address a series of eight variable fill characters, VF1 through VF8, are inserted. Each of these eight variable fill characters contains six random bits, with the 7th bit set to a "1" so that it is never a control character, and the 8th bit character parity. Thus, the eight characters contain 48 bits of random information.

These 48 bits of random data are obtained in a similar manner to the link encryption mode as explained previously. The cipher feedback register 11-2 operates at the system clock rate as a shift code counter between messages to generate a pseudo-random bit pattern. This counter is initiated with the detection of the ETX character, even in constant carrier environments, and continues to run until the detection of the next STX characters when the counter is inhibited and the cipher feedback register is returned to normal operation. This random bit pattern in the cipher feedback register 11-2 is used as the initial preset input to the algorithm module 11-6 which is then activated and run in the normal manner for eight iterations. Six of the eight key bits generated each iteration are utilized and transmitted as variable fill characters VF1 through VF8. They are simultaneously fed back into the cipher feedback register 11-2 and form the initial 64-bit preset pattern to the algorithm module 11-6 to perform the encryption processing on the first data character of the message after STX.

CONTROL CHARACTER SEQUENCES

Nominally, in the selective encryption mode of operation, all input data between STX and ETX, except control characters, will be encrypted and will appear on the output as cipher text. However, the device can be strapped to be sensitive to input control character sequences from the DTE which switch the output data between the plain text input or the cipher test generated by the plain text input. These control sequences are one or two control characters consisting of a start encrypt field (SEF), and an end encrypt field (EEF) as shown in FIG. 12. These characters are strappable to any selected control bit pattern.

The occurrence of SEF or EEF before STX will be ignored. The device is initially set to provide plain text output. Encrypted data, or cipher text, will appear on the output data line on the next character following SEF. Cipher text will continue as the output until an EEF is detected at which time the unit will output the plain text input data starting on the first character following EEF. There is no limit to the number of transitions between cipher text or plain text within a message. ETX resets the device to the initial condition of providing plain text output.

INTERCHANGE STATUS

Information is provided to the transmitting DTE as to whether the selective encryption device is providing plain text or cipher text output. This encrypt status interchange will be indicated on an optionally selectable pin (#'s 11, 12, 13, 14, 16, 18, 19, or 25) of the EIA RS-232-C interface to the transmitting DTE. When the selective encryption device is transmitting plain text, the line will be in the high, "1", state. The line will be in the low, "0", state when transmitting encrypted data.

CHARACTER PARITY

All input characters to the device are checked for correct parity. If the device is in the plain text mode, input plain text characters with incorrect parity are transmitted with this incorrect parity, and the internal encryption process places the encrypted character in the cipher feedback register with incorrect parity.

If the device is transmitting cipher text and receives a plain text input character with bad parity, the encryption process places the encrypted character in the cipher feedback register with bad parity, and the cipher text output character is sent with incorrect parity.

Input control characters with bad parity are transmitted with bad parity and are ignored internally.

BLOCK CHECK CHARACTER

A block check sum will be accumulated for the incoming data and checked against the incoming BCC for correctness. If incorrect, the BCC sent on the output is deliberately made incorrect. A block check sum will be accumulated within the device for all outgoing data, both plain and cipher text. This generated BCC will be sent following ETX or ETB.

RECEIVE OPERATION

The receive operation is initiated by the DCE interface signals to the Selective Encryption/Authentication Device. The operation of this interface in conjunction with the RS-232-C interface with the receiving DTE will be discussed below.

The only input messages that will be processed are those starting with SOH, and which contain an STX which is immediately followed by an IF containing an origination address (AD3-AD4) for which a key variable is stored within the device. All other messages will be passed along to the receiving DTE unmodified.

Figure 14:
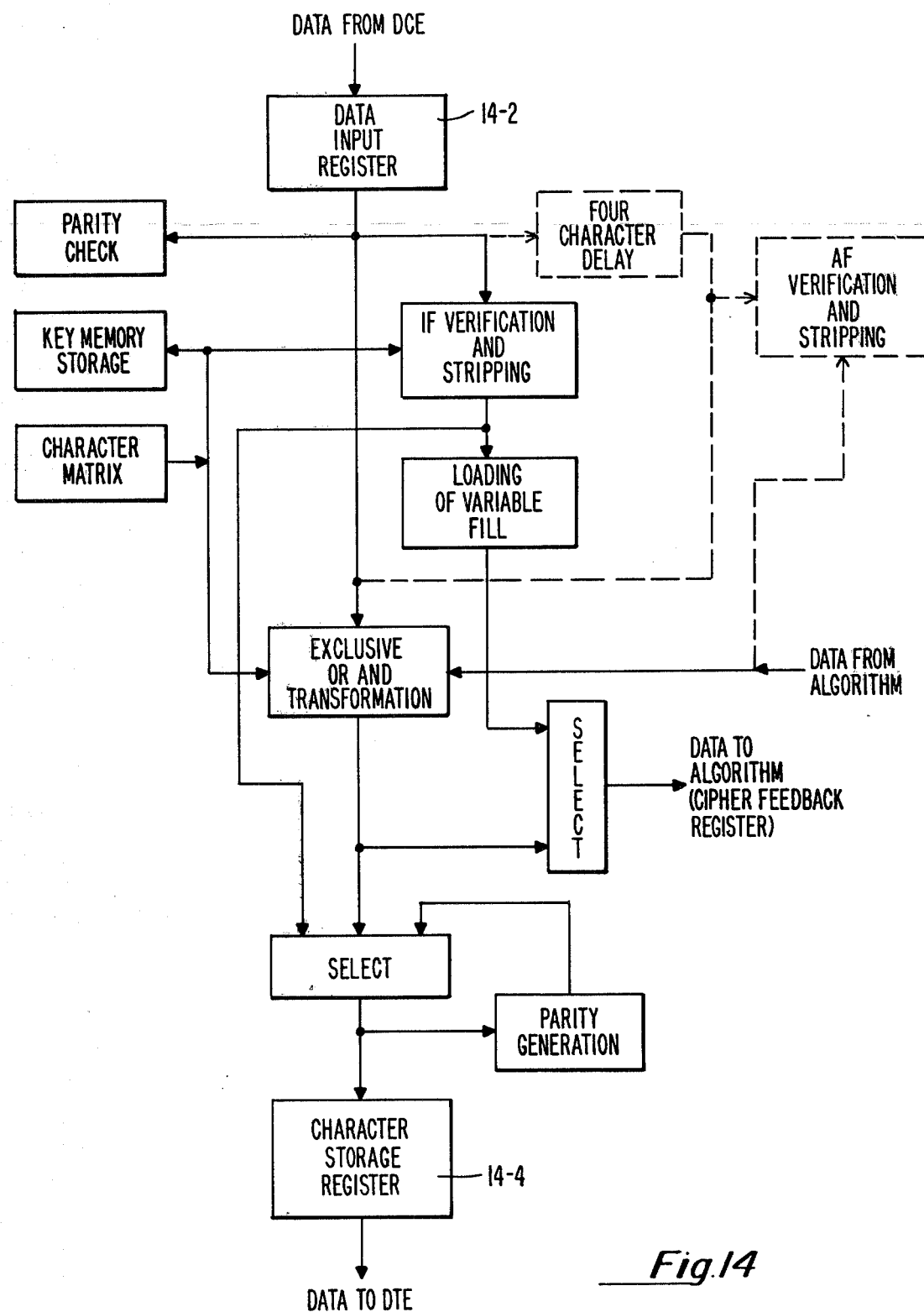
FIG. 14 is a simplified block diagram of the receive processing operation.

FIG. 14 is a simplified block diagram of the receive processing operation. Characters are received from the DCE and placed into an input register 14-2. Character parity is checked and the character either passed directly to the output, given an IF verification and processed with data from the algorithm, or held in the character storage register. The IF will be stripped from messages before transferring the message to the DTE. Since this IF contains eleven characters, the SOH and following characters up to and including STX are held in the character storage register 14-4 for this time interval. The character matrix contains the SEF and EEF control character sequences to detect when to go in and out of the encrypt mode. A BCC is generated over the entire output message.

DESTINATION ADDRESS

The destination address, AD1-AD2, of the receiving DTE is passed along to the output as received from the DCE.

IDENTIFICATION FIELD

The IF immediately follows STX and must begin with the SIC character. If not present the message will be passed along to the DTE unmodified. The next two characters, AD3-AD4, are the origination address. The key memory storage 9-34 is searched for this address and when located, the associated key variable is entered directly into the algorithm module 9-6. If not located, the input message is passed along to the DTE unmodified.

The next eight characters, VF1 through VF8, are the variable fill characters which are loaded directly into the cipher feedback register 11-2. Once this is accomplished, the device is in the same initial state as the transmitting device, and the decryption process is initiated on all characters which follow.

CONTROL CHARACTER SEQUENCES

Nominally, the device will decrypt all characters beginning with the first character following the end of the IF up to the last data character before ETX in the normal manner, by entering cipher text directly into the cipher feedback register 11-2. This assures asynchronization to generate the proper key bits for the decryption process of exclusive ORing and translation into the plain text output.

If the device is strapped for control character sequencing, it examines each input data character for the SEF and EEF sequences. All input data, starting with the first data character after the IF, will be passed along to the DTE as plain text until an SEF sequence is detected. All characters following this sequence will be decrypted before presentation to the receiving DTE until an EEF sequence is detected. Detection of this EEF causes the device to revert to passing along the input plain text directly to the DTE. The algorithm 9-6 in conjunction with the cipher feedback register is run every character time to produce the identical key bits that were generated in the transmitting device. ETX resets the device to the initial condition of providing plain text output.

INTERCHANGE STATUS

An optionally selectable pin (#'s 11, 12, 13, 14, 16, 18, 19, or 25) or the EIA RS-232-C interface to the receiving DTE is used to indicate the status of the IF received by the selective encryption device. The line will be in the high, "1", state for an incorrect IF, and in the low, "0", state for a correct IF.

CHARACTER PARITY

All input characters to the device will be checked for correct parity. If the device is in the plain text mode, input plain text characters with incorrect parity will be sent to the receiving DTE with this incorrect parity, and the internal encryption process will also place the encrypted character in the cipher feedback register 11-2 with the incorrect parity.

If the device receives a cipher text character with incorrect parity, it processes it normally and sends the decrypted plain text character to the receiving DTE with bad parity. Eight characters following this will be garbled to the DTE.

If the decrypted cipher text input character has bad parity, the output plain text character to the DTE will be sent with bad parity, and the parity of the incoming cipher text character will be placed in the cipher feedback register 11-2 with incorrect parity.

Incoming control characters with bad parity will be sent to the receiving DTE with bad parity and ignored internally.

BLOCK CHECK CHARACTER

A block check sum will be accumulated for the incoming data and checked against the incoming BCC for correctness. If incorrect, the BCC sent to the DTE will be deliberately made incorrect. A block check sum will then be accumulated within the device for all data output to the DTE and added to the output following the ETX character if the incoming BCC was correct.

END-TO-END AUTHENTICATION OPERATION

Operation of the Selective Encryption/Authentication Device in the end-to-end authentication mode is very similar to the selective encryption device just described as illustrated in FIG. 9. The device in this mode is sensitive to the same data communication procedures; is 8-bit byte, or character oriented; utilizes the same algorithm module 9-6, algorithm control module 9-8, transmit processing module 9-2, receive processing module 9-4, hexadecimal keyloading device 9-10 and key variable memory storage 9-34; and provides the same interfaces 9-40,42 to the DTE and DCE.

The major difference in this mode of operation is that all of the plain text input data also appears on the output data line as plain text. Internally, this plain text is also processed in the same manner as if it were being encrypted by the operation of the algorithm module 9-6 and its associated cipher storage register 11-2. However, the cipher text generated is not sent as output data. Rather, on detection of ETX at the input data line, this internal encryption processing is ended and 16 of the 64 key bits residing in the algorithm 9-6 as a residue area are appended to the output message as an authentication field (AF) in the form of four hexadecimal characters which are then followed by ETX.

The algorithm unit 9-6 operates only in the encrypt mode and both transmitting and receiving devices operate on the data in the same manner. Since the input to both of these devices is the same plain text, the internally generated cipher text is identical. Hence, when the receiver detects ETX, the 16 key bits contained in the incoming AF will be checked with the 16 key bits remaining as a residue in the receiver algorithm module 9-6 for identity. An exact comparison indicates message integrity, i.e., the received message is identical to the transmitted message.

Since all characters, except the AF characters, are transmitted in plain text, control character translation is unnecessary. The characters in the AF are generated such that they are control characters.

Generation, detection, and processing of the IF is the same as in the selective encryption mode, as well as operation of the key variable memory storage.

AUTHENTICATION DEVICE

Figure 15:
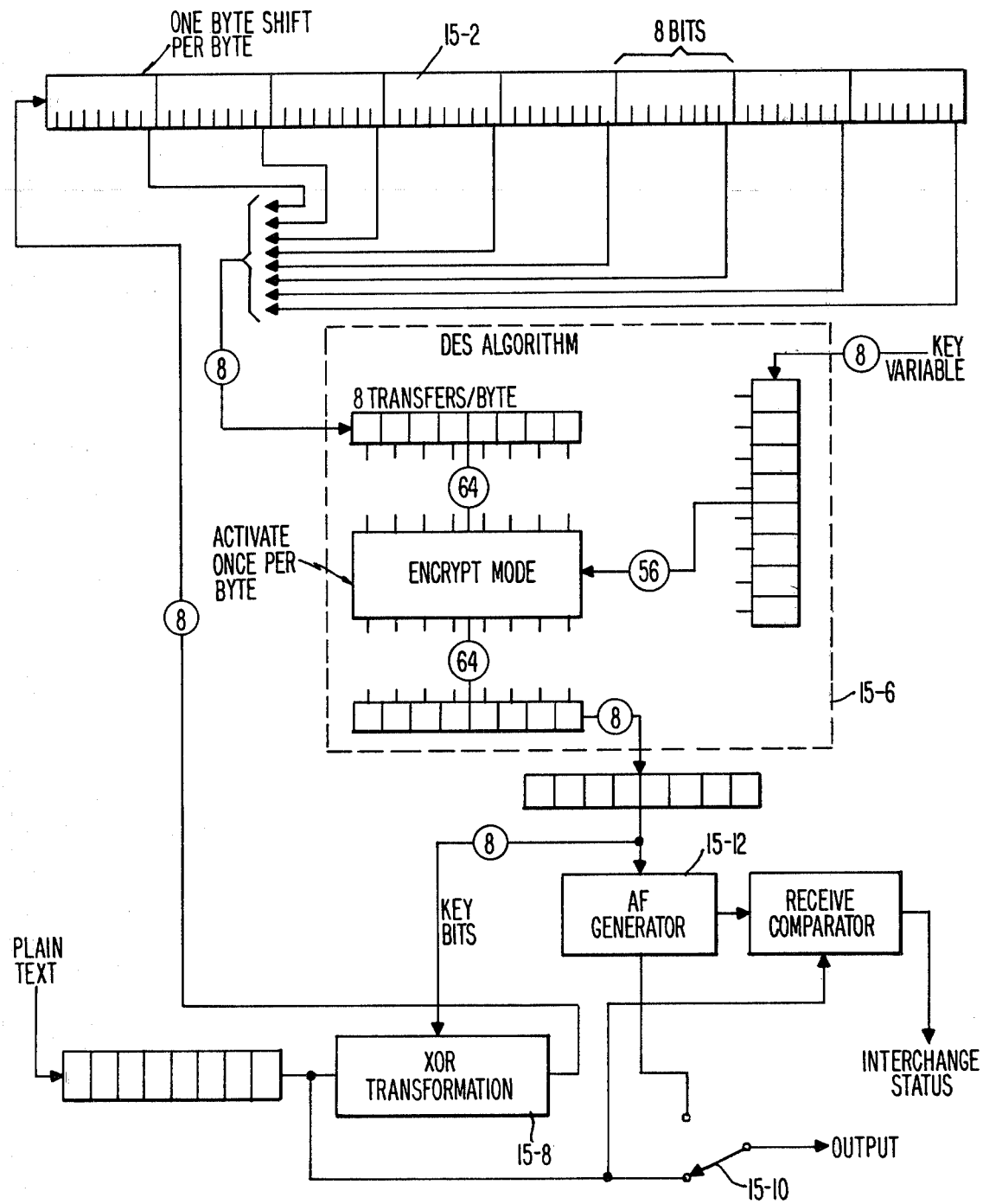
FIG. 15 illustrates the SE/AD utilized as just an authentication device which serves as both a transmitter and a receiver.

FIG. 15 illustrates the Selective Encryption/Authentication Device utilized as just an authentication device which serves as both a transmitter and a receiver. Operation is in the encrypt mode only. As shown, the output of the device is nominally the plain text input. This plain text is also encrypted in the normal manner by operating the algorithm as a key generator. The eight key bits generated by each iteration of the algorithm 15-6 are exclusive ORed 15-8 with the plain text character and the resultant cipher is entered into the cipher feedback register 15-2. This operation continues character by character until the detection of ETX.

In the transmitter, detection of ETX causes the output to switch 15-10 to the AF generator 15-12, and the AF is appended to the output message. In the receiver, detection of ETX also causes an AF to be generated, and a comparison is made with the incoming AF.

MESSAGE FLOW

Figure 16:
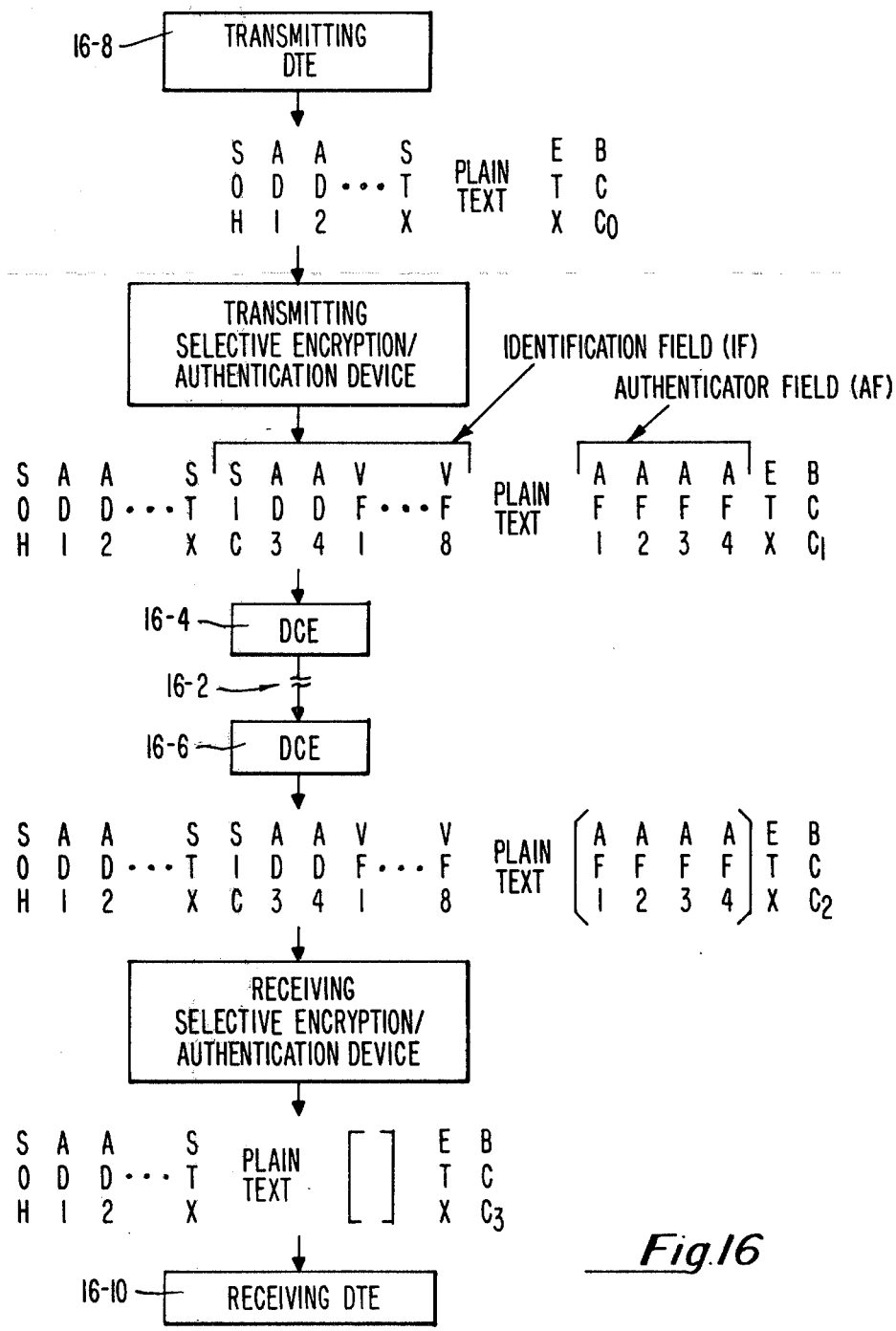
FIG. 16 shows the message flow in a communication network that utilizes end-to-end authentication mode devices.

FIG. 16 shows the message flow in a communication network that utilizes end-to-end authentication mode devices. Devices are only required at each end of the network, and the break 16-2 shown between the DCE's 16-4,6 can include any number of message switches or concentrators.

SYSTEM DELAY

Comparison of FIGS. 12 and 16 shows that the only differences are in the transmitted text. Only plain text appears in the authentication device with the addition of the authenticator field (AF), whereas both plain and cipher text appear in the selective encryption device without an appended AF.

In the preferred embodiment, this added AF will increase the system delay by four character times at bit rates up to 4.8 K bps. This means that the ETX character or the transmitting DTE 16-8 arrives at the receiving DTE 16-10 delayed 17 character times.

Above 4.8 K bps additional delay is introduced for the key variable lookup required, as tabulated below:

| K bit/sec. | Key Variable Lookup Delay (130 μsec) (characters) | Total Delay (characters) |
|---|---|---|
| 9.6 | 1.3 | 19 |
| 19.2 | 2.5 | 20 |
| 56 | 7.4 | 25 |
| 64 | 8.4 | 26 |

When the optional interchange status character is implemented, an additional one character delay results.

TRANSMIT OPERATION

The transmit operation for the authentication mode device is the same as described above for the selective encryption mode device except for the insertion of the AF before the ETX character as shown in FIG. 13.

The destination address, identification field, character parity, and block check character are all as described for a transmit operation in an end-to-end selective encryption operation.

AUTHENTICATION FIELD

When the transmitting device detects ETX as the input character, the output of the device is switched to the AF generator. Four hexadecimal digits are transmitted with a format of 100 XXXX, where XXXX is a hexadecimal digit. Bit 8 is character parity. ETX is transmitted immediately after the AF.

RECEIVE OPERATION

The receive operation for the authentication mode device is the same as that described for the selective encryption mode device except for the verification and stripping of the AF from the input message as shown in FIG. 14.

AUTHENTICATOR FIELD

Since there is no delimiter to mark the beginning of the AF, the receiver introduces an additional four-character delay into the incoming message before processing is initiated as shown in FIG. 14. When ETX is detected on the input, the four immediately preceding characters form the AF. At this time, the receiving device inhibits further inputs to the cipher feedback register and compares the residue remaining in its algorithm module (i.e., the same 16 and 64 key bits which were utilized by the transmitting device and contained in the four incoming hexadecimal digits as the AF) with the incoming AF. An exact comparison assures message integrity, and the AF is stripped from the incoming message and ETX is sent to the DTE. Non-comparison activates the interchangeable circuit.

Character parity and the block check character are handled in the same manner as was described for a receive operation in end-to-end selective encryption mode. Interchange status is also handled as previously described for a receive operation in end-to-end selective encryption mode, except that the indication will be ORed to also indicate a correct or incorrect AF status.

OPTIONAL INTERCHANGE STATUS

One of three characters can be optionally appended to the message sent to the receiving DTE to indicate the AF status.

ASCII "(" (111 1011) indicates a valid AF.
ASCII "[" (101 1011) indicates an invalid AF.
ASCII "+" (010 1011) indicates no IF.

END-TO-END SELECTIVE ENCRYPTION WITH AUTHENTICATION OPERATION

This mode of operation combines the capabilities of the selective encryption and authentication modes to provide message integrity in systems where portions of the message are transmitted in plain text.

Essentially the device operates in the selective encryption mode where selected portions of the message are sent in plain text by means of control character sequencing as described in the discussuion of end-to-end selective encryption operation, but with the addition of the AF generation and handling as described in the discussion of end-to-end authentication operation.

FIG. 17 shows the message flow in a communication network which combines the selective encryption message flow (FIG. 12) and the authentication message flow (FIG. 16) into a system containing both modes of operation. Functionally the device operates as described in an end-to-end selective encryption operation with the addition of the AF as described in an end-to-end authentication operation.

The operational environments and the descriptions of synchronous operation, asynchronous operation, control character translation, multiple key variables, the key variable memory storage option, byte stream encryption/decryption and message flow are the same as described previously in the discussion of end-to-end selective encryption operation. The description given for system delay for an end-to-end authentication operation is applicable to end-to-end selective encryption with authentication operation.

The transmit operation is the same as for the end-to-end selective encryption mode described previously with the addition of the AF as described in end-to-end authentication operation. The simplified block diagram shown in FIG. 13 is applicable when the dashed portion for the AF generation is included.

The receive operation is the same as for the end-to-end mode described previously, with the addition of the AF stripping and delay as described in end-to-end authentication operation. The simplified block diagram shown in FIG. 14 is applicable when the dashed portion for the AF stripping and four-character delay is added.

The discussion on the following aspects of transmit and receive operations given previously in discussing end-to-end selective encryption are directly applicable to this mode of operation: destination address, identification field, control character sequences, interchange status, character parity and block character check.

What is claimed is:

1. An apparatus for providing data communications security in point-to-point and multipoint communications networks, wherein plain text data on a communications line is enciphered on a bit-by-bit basis when received from said communications line, comprising:
    means for receiving said plain text data from said communications line on a bit-by-bit basis;
    means for generating a plurality of key bits for each bit of said plain text data received from said communications line;
    means for storing said plurality of key bits;
    means for exclusive ORing each bit of said plain text data with one of said plurality of key bits generated for the bit previous to each of said bits of plain text data, whereby a bit of enciphered data is produced corresponding to each of said bits of plain text data; and
    means for transmitting each of said bits of enciphered data onto said communications line, whereby each of said bits of plain text data is replaced by the corresponding bit of reciphered data.

2. The apparatus of claim 1 wherein said key bit generation means comprises:
    register means, one bit position of which receives its input from the output of said exclusive ORing means, said register means including means for presenting a bit pattern from which said plurality of key bits will be generated; and
    means, connected to said register means, for encoding said presented bit pattern whereby said plurality of key bits is produced.

3. The apparatus of claim 2 wherein said encoding means includes means for storing a key variable for use by said encoding means in encoding said presented bit pattern.

4. The apparatus of claim 3 wherein said encoding means further include means for entering said key variable from a source external to said apparatus.

5. The apparatus of claim 2 wherein said register means further includes means for operating said register means as a shift code counter.

6. The apparatus of claim 1 further comprising means for transmitting said bit of plain text onto said communications line and inhibiting the transmission of said bit of enciphered data.

7. The apparatus of claim 1 further comprising means for selectively switching the output of said apparatus, under external control, between said input plain text data and said enciphered data generated within said apparatus.

8. The apparatus of claim 1 further comprising means for inhibiting the transmission of said enciphered data.

9. The apparatus of claim 1 wherein said key bit generation means comprises:
    register means, the high order bit position of which receives its input from the output of said exlcusive ORing means, said register means including means for presenting a bit pattern from which said plurality of key bits will be generated; and
    means, connected to said register means, for encoding said presented bit pattern, whereby said plurality of key bits is produced.

10. An apparatus for providing data communications security in point-to-point and multipoint communications networks, wherein enciphered data on a communications line is deciphered on a bit-by-bit basis when received from said communications line, comprising:
    means for receiving said enciphered data from said communications line on a bit-by-bit basis;
    means for generating a plurality of key bits for each bit of said enciphered data received from said communications line;
    means for storing said plurality of key bits;
    means for exclusive ORing each bit of said enciphered data with one of said plurality of key bits generated for the bit previous to each of said bits of enciphered data, whereby a bit of plain text data is produced corresponding to each of said bits of enciphered data; and
    means for transmitting each of said bits of plain text data onto said communications line, whereby each of said bits of enciphered data is replaced by the corresponding bit of plain text data.

11. The apparaus of claim 10 wherein said key bit generation means comprises:
    register means, one bit position of which receives its input from said receiving means, said register means including means for presenting a bit pattern from which said plurality of key bits will be generated; and
    means, connected to said register means, for encoding said presented bit pattern whereby said plurality of key bits is produced.

12. The apparatus of claim 11 wherein said encoding means includes means for storing a key variable for use by said encoding means in encoding said presented bit pattern.

13. The apparatus of claim 12 wherein said encoding means further includes means for entering said key variable from a source external to said apparatus.

14. The apparatus of claim 11 wherein said register means further includes means for operating said register means as a shift code counter.

15. The apparatus of claim 10 further comprising means for transmitting said bit of enciphered data onto said communications line and inhibiting the transmission of said bit of plain text data.

16. The apparatus of claim 10 further comprising means for selectively switching the output of said apparatus, under external control, between said input enciphered data and said plain text generated within said apparatus.

17. The apparatus of claim 10 further comprising means for inhibiting the transmission of said deciphered data.

18. An apparatus for insertion in a bidirectional communications line for providing full duplex data communications security in point-to-point and multipoint communications networks, wherein plain text data being transmitted on said communications line in a first direction is received by said apparatus, enciphered, and transmitted back onto said communications line in said first direction on a bit-by-bit basis, and enciphered data being transmitted on said communications line in a second direction is received by said apparatus, deciphered and transmitted back onto said communications line in said second direction on a bit-by-bit basis, comprising:
means for receiving a bit of said plain text data being transmitted in said first direction from said communications line;
means for enciphering said bit of plain text data received from said communications line;
means for transmitting said bit of enciphered data corresponding to said bit of plain text data being transmitted in said first direction onto said communications line whereby said bit of plain text data being transmitted in said first direction is replaced by said bit of enciphered data corresponding to said bit of plain text data being transmitted in said first direction;
means for receiving a bit of said enciphered data being transmitted in said second direction from said communications line;
means for deciphering said bit of enciphered data received from said communications line; and
means for transmitting said bit of deciphered data corresponding to said bit of enciphered data being transmitted in said second direction onto said communications line whereby said bit of enciphered data being transmitted in said second direction is replaced by said bit of deciphered data corresponding to said bit of enciphered data being transmitted in said second direction.

19. The apparatus of claim 18 wherein:
said means for enciphering said bit of plain text data comprises
first means for generating a first plurality of key bits,
second means for storing said first plurality of key bits, and
third means for exclusive ORing said bit of plain text data with one of said first plurality of key bits whereby a first bit of enciphered data corresponding to said bit of plain text data is produced; and
said means for deciphering said bit of enciphered data comprises
fourth means for generating a second plurality of key bits,
fifth means for storing said second plurality of key bits, and
sixth means for exclusive ORing said bit of enciphered data with one of said second plurality of key bits whereby, a second bit of plain text data corresponding to said bit of enciphered data is produced.

20. The apparatus of claim 19 wherein said first means comprises:
first register means, one bit position of which receives its input from the output of said third means, said first register means for presenting a first bit pattern from which said first plurality of key bits will be generated; and
first encoding means, connected to said first register means, for encoding said first presented bit pattern whereby said first plurality of key bits is produced.

21. The apparatus of claim 20 wherein said fourth means comprises:
second register means, one bit position of which receives its input from said enciphered data receiving means, said second register means including means for presenting a second bit pattern from which said second plurality of key bits will be generated; and
second encoding means, connected to said second register means, for encoding said second presented bit pattern whereby said second plurality of key bits is produced.

22. The apparatus of claim 10 wherein said key bit generation means comprises:
register means, the high order bit position of which receives its input from said receiving means, said register means including means for presenting a bit pattern from which said plurality of key bits will be generated; and
means, connected to said register means, for encoding said presented bit pattern, whereby said plurality of key bits is produced.

23. An apparatus for use in the transmission of digital data in enciphered form, wherein a sequence of plain text data is sequentially enciphered on a bit-by-bit basis, comprising:
means for generating a plurality of key bits for each bit of said sequence of plain text data;
means for storing said plurality of generated key bits; and
means for exclusive ORing each bit of said plain text data sequence with one of said plurality of key bits generated for the bit previous to each of said bits of said plain text data sequence, whereby a bit of enciphered data is produced corresponding to each of said bits of said plain text data sequence.

24. The appartus of claim 23 wherein said key bit generation means comprises:
register means, at least one bit of which receives its input from the output of said exclusive ORing means, said register means including means for presenting a bit pattern from which said plurality of key bits will be generated; and
means, connected to said register means, for encoding said presented bit pattern whereby said plurality of key bits is produced.

25. An apparatus for use in the transmission of digital data in enciphered form, wherein a sequence of enciphered data is sequentially deciphered on a bit-by-bit basis, comprising:
means for generating a plurality of key bits for each bit of said sequence of enciphered data;
means for storing said plurality of generated key bits; and
means for exclusive ORing each bit of said enciphered data sequence with one of said plurality of key bits generated for the bit previous to each of said bits of said enciphered data sequence, whereby a bit of plain text data is produced corresponding to each of said bits of said enciphered data sequence.

26. The apparatus of claim 25 wherein said key bit generation means comprises:

register means, at least one bit of which receives its input from the bit previous to each of said bits of said enciphered data sequence, said register means including means for presenting a bit pattern from which said plurality of key bits will be generated; and means, connected to said register means, for encoding said presented bit pattern whereby said plurality of key bits is produced.

* * * * *

UNITED STATES PATENT AND TRADEMARK OFFICE
CERTIFICATE OF CORRECTION

PATENT NO. : 4,160,120

DATED : July 3, 1979

INVENTOR(S) : Vera L. Barnes, et al.

It is certified that error appears in the above-identified patent and that said Letters Patent are hereby corrected as shown below:

In the figure appearing on the cover page, change the label of the input to the right hand side of the DES ALGORITHM block 2-2 from "KEY YARIABLE INPUT" to --KEY VARIABLE INPUT--.

In drawing FIG. 2, change the label of the input to the right hand side of the DES ALGORITHM block 2-2 from "KEY YARIABLE INPUT" to --KEY VARIABLE INPUT--.

At column 3, line 31, delete "register".
At column 4, line 67, change "receives" to --received--.
At column 9, line 44, change "excatly" to --exactly--.
At column 10, line 14, change "test" to --text--.
At column 14, line 4, change "sent" to --send--.
At column 16, line 37, after "8-bit" insert --byte--.
At column 16, line 66, change "the" to --that--.
At column 17, line 54, change "concentrates" to --concentrators--.

UNITED STATES PATENT AND TRADEMARK OFFICE
CERTIFICATE OF CORRECTION

PATENT NO. : 4,160,120

DATED : July 3, 1979

INVENTOR(S) : Vera L. Barnes, et al.

It is certified that error appears in the above-identified patent and that said Letters Patent are hereby corrected as shown below:

At column 20, line 33, in the table column labeled k bit/sec, change the first entry from "9,6" to --9.6--.

At column 21, line 63, change "cipher test" to --cipher text--.

At column 27, line 48, change "reciphered" to --enciphered--.

At column 27, line 64, change "include" to --includes--.

At column 28, line 15, change "exlcusive" to --exclusive--.

At column 29, line 64, change "whereby, a" to --whereby a--.

Signed and Sealed this

Sixth Day of November 1979

[SEAL]

Attest:

RUTH C. MASON
Attesting Officer

LUTRELLE F. PARKER
Acting Commissioner of Patents and Trademarks